(12) United States Patent
Murayama et al.

(10) Patent No.: US 9,566,968 B2
(45) Date of Patent: Feb. 14, 2017

(54) INPUT DEVICE OF VEHICLE BRAKE SYSTEM

(75) Inventors: Kazuaki Murayama, Saitama (JP); Kunimichi Hatano, Saitama (JP); Arata Inoue, Saitama (JP); Kazuyoshi Akutsu, Saitama (JP); Takaaki Ohnishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 600 days.

(21) Appl. No.: 13/885,889

(22) PCT Filed: Nov. 16, 2011

(86) PCT No.: PCT/JP2011/076361
§ 371 (c)(1),
(2), (4) Date: May 16, 2013

(87) PCT Pub. No.: WO2012/067134
PCT Pub. Date: May 24, 2012

(65) Prior Publication Data
US 2013/0232967 A1 Sep. 12, 2013

(30) Foreign Application Priority Data

Nov. 17, 2010 (JP) .................................. 2010-257328
Nov. 17, 2010 (JP) .................................. 2010-257351
(Continued)

(51) Int. Cl.
*B60T 13/00* (2006.01)
*B60T 13/74* (2006.01)
(Continued)

(52) U.S. Cl.
CPC .............. *B60T 13/745* (2013.01); *B60T 7/042* (2013.01); *B60T 8/4081* (2013.01)

(58) Field of Classification Search
CPC ...... B60T 7/042; B60T 8/4081; B60T 8/4086; B60T 11/22; B60T 11/26; B60T 11/203; B60T 17/06; B60T 13/142; F15B 7/08; F15B 1/26
(Continued)

(56) References Cited

U.S. PATENT DOCUMENTS 3,425,222 A * 2/1969 Cooney et al. .................. 60/563
4,499,730 A * 2/1985 Kasahara ................ B60T 11/22
60/585
(Continued)

FOREIGN PATENT DOCUMENTS

EP 1 291 257 A1 3/2003
EP 1 600 347 A1 11/2005
(Continued)

OTHER PUBLICATIONS

JP 2007176277—Machine Translation from ESPACENET, Master Cylinder Device, Pub date—Jul. 2007.*
(Continued)

*Primary Examiner* — Michael Leslie
*Assistant Examiner* — Dustin T Nguyen
(74) *Attorney, Agent, or Firm* — Carrier Blackman & Associates, P.C.; Joseph P. Carrier; William D. Blackman

(57) ABSTRACT

An input device of a vehicle brake system which is downsized and has an improved general versatility in comparison with conventional vehicle brake systems is provided. An input device 14 includes: a master cylinder 34 that produces a fluid pressure in accordance with an input of an operation of a brake operating member 12; and a stroke simulator 64 which is provided side by side with the master cylinder 34 and which applies in a pseudo manner a force counteracting the operation of the brake operating member 12 to the brake
(Continued)

operating member 12. The master cylinder 34 and the stroke simulator 64 are formed integrally.

15 Claims, 15 Drawing Sheets

(30) Foreign Application Priority Data

| Nov. 17, 2010 | (JP) | ................. | 2010-257352 |
|---|---|---|---|
| Nov. 17, 2010 | (JP) | ................. | 2010-257353 |
| Nov. 17, 2010 | (JP) | ................. | 2010-257355 |

(51) Int. Cl.
 *B60T 7/04* (2006.01)
 *B60T 8/40* (2006.01)

(58) Field of Classification Search
 USPC ............ 60/545, 562, 584; 303/115.3, 113.4, 303/119.3
 See application file for complete search history.

(56) References Cited

U.S. PATENT DOCUMENTS

| 4,898,434 | A | | 2/1990 | Kohno et al. | |
|---|---|---|---|---|---|
| 4,969,331 | A | * | 11/1990 | Holka | B60T 13/565 180/90.6 |
| 6,058,705 | A | * | 5/2000 | Schunck | 60/562 |
| 6,312,061 | B1 | * | 11/2001 | Schliebe | B60T 8/00 303/20 |
| 9,115,727 | B2 | * | 8/2015 | Matsunaga | F15B 1/26 |
| 2002/0023437 | A1 | * | 2/2002 | Kanazawa et al. | 60/562 |
| 2002/0149259 | A1 | * | 10/2002 | Otomo | B60T 8/367 303/3 |
| 2003/0038541 | A1 | | 2/2003 | Suzuki et al. | |
| 2005/0042946 | A1 | * | 2/2005 | Longpre | B63B 19/12 440/76 |
| 2008/0036291 | A1 | * | 2/2008 | Sakai | B60T 8/368 303/11 |
| 2008/0048492 | A1 | * | 2/2008 | Sakai | B60T 8/26 303/113.1 |
| 2008/0079309 | A1 | * | 4/2008 | Hatano | B60T 8/4081 303/113.5 |
| 2009/0195060 | A1 | * | 8/2009 | Nishikawa et al. | 303/116.1 |

FOREIGN PATENT DOCUMENTS

| EP | 1 970 271 | A1 | | 9/2008 |
|---|---|---|---|---|
| JP | S63116966 | A | | 5/1988 |
| JP | 2005-153583 | A | | 6/2005 |
| JP | 2007010121 | A | | 1/2007 |
| JP | 2007-176277 | A | | 7/2007 |
| JP | 2007176277 | A | * | 7/2007 |
| JP | 2010-023594 | A | | 2/2010 |
| JP | 2010-023954 | A | | 2/2010 |
| JP | 2010-254261 | A | | 11/2010 |
| JP | 2010254261 | A | * | 11/2010 |

OTHER PUBLICATIONS

JP 2010254261—Machine Translation from WIPO, Brake Control Device, Pub date—Nov. 2010.*

Extended European search report issued on Mar. 31, 2014 in the corresponding EP Patent Application 11842089.2.

Notice of Reason for Rejection for corresponding Japanese Application No. 2010-257328 issued on Jan. 7, 2013 from the Japan Patent Office.

Notice of Reason for Rejection for corresponding Japanese Application No. 2010-257353 issued on Jan. 7, 2013 from the Japan Patent Office.

* cited by examiner

INPUT DEVICE OF VEHICLE BRAKE SYSTEM

TECHNICAL FIELD

The present invention relates to an input device of a vehicle brake system.

BACKGROUND ART

Examples of conventional vehicular (automobile) brake systems known are ones equipped with a servo unit such as a vacuum booster or a hydraulic booster. In recent years, electric boosters that are driven by an electric motor have become popular (see, for example, Patent Document 1).

The electric booster disclosed in Patent Document 1 includes a main piston that moves back and forth in accordance with an operation of a brake pedal, a cylindrical booster piston that is externally engaged in a manner displaceable relative to the main piston, and a rotation-linear-motion converting mechanism like a ball screw that transmits the rotational force of an electric motor to the booster piston as a booster thrust force.

According to this electric booster, the main piston and the booster piston are utilized as pistons for a master cylinder, and respective front ends of those pistons are in communication with the pressure chamber of the master cylinder. Hence, a brake fluid pressure is produced in the master cylinder by a thrust force input into the main piston from an operator through the brake pedal and the booster thrust force input into the booster piston from the electric motor.

PRIOR ART DOCUMENT

Patent Document

Patent Document 1: JP 2010-23594 A

DISCLOSURE OF INVENTION

Problem to be Solved by the Invention

According to the electric booster disclosed in Patent Document 1, however, an input device into which a brake operation is input by the operator, and an electric brake actuator that produces the brake fluid pressure based on an electric signal in accordance with the brake operation, etc., are assembled as a single unit and disposed ahead of the brake pedal. Hence, the electric booster has a little degree of freedom for the layout in a device mounting space where devices such as the engine of a vehicle and a driving motor are mounted, and in some cases, lacks a general-purpose property, rendering it inapplicable to multiple kinds of vehicles. In particular, the input device into which the brake operation is input by the operator is limited as to the location where it is installed, and thus downsizing of the input device has been desired.

The present invention has been made in view of the above-explained problems, and it is an object of the present invention to provide an input device of a vehicle brake system which is downsized and has an improved general-purpose property in comparison with conventional vehicle brake systems.

Means for Solving the Problem

The inventors of the present invention keenly studied in order to solve the above-explained problems, and found that the above-explained problems can be solved by forming at least a master cylinder and a stroke simulator integrally, thereby accomplishing the present invention.

That is, the present invention provides an input device of a vehicle brake system, the vehicle brake system comprising: the input device into which an operation of a brake operating member is input; and an electric brake actuator which controls a brake fluid pressure based on at least an electric signal generated in accordance with the operation of the brake operating member, the input device being structured as a separate device from the electric brake actuator and including the brake operating member so as to be operated by an operator, the input device comprising: a master cylinder that produces a fluid pressure in accordance with the input of the operation of the brake operating member; and a stroke simulator that is provided side by side with the master cylinder, is in communication with the master cylinder, and applies in a pseudo manner a force counteracting the operation of the brake operating member to the brake operating member, wherein the master cylinder and the stroke simulator are formed integrally (first aspect).

According to the first aspect of the present invention, the piping between the master cylinder and the stroke simulator can be shortened, and thus the input device including the master cylinder and the stroke simulator can be downsized. The input device of a vehicle brake system downsized in this manner is appropriately mountable to hybrid vehicles and electric vehicles which have a little device-mounting space in comparison with gasoline-fueled vehicles. As a result, components can be made common between the gasoline-fueled vehicles, the hybrid vehicles, and the electric vehicles, and thus the general versatility of the components is enhanced, resulting in a reduction of manufacturing costs.

The present invention also provides the input device of the vehicle brake system further comprising: a first pressure sensor provided between the master cylinder and a first cut-off valve, and a second pressure sensor provided between a second cut-off valve and a second connection port (second aspect).

According to the second aspect of the present invention, an appropriate brake control is enabled by using the two pressure sensors.

The present invention also provides the input device of the vehicle brake system further comprising an air bleeder for bleeding the air out of at least the master cylinder and the stroke simulator (third aspect).

According to the third aspect of the present invention, the air in at least the master cylinder and the stroke simulator can be bled, and thus a defect of the brake system can be more surely suppressed.

The present invention also provides the input device of the vehicle brake system wherein the master cylinder and the stroke simulator are provided side by side in an integral manner in a vehicle width direction (fourth aspect).

According to the fourth aspect of the present invention, in particular, the fluid passage between the master cylinder and the stroke simulator can be shortened, and thus the input device including the master cylinder and the stroke simulator can be downsized. The input device of a vehicle brake system downsized in this manner is appropriately mountable to hybrid vehicles and electric vehicles which have a little device-mounting space in comparison with gasoline-fueled vehicles. As a result, components can be made common between the gasoline-fueled vehicles, the hybrid vehicles, and the electric vehicles, and thus the general versatility of the components is enhanced, resulting in a reduction of manufacturing costs.

The present invention also provides the input device of the vehicle brake system further comprising a reservoir tank provided above the master cylinder and the stroke simulator and between the master cylinder and the stroke simulator. (fifth aspect).

According to the fifth aspect of the present invention, the reservoir tank can be surely disposed in hybrid vehicles, etc., having a limited mounting space. Moreover, the general versatility of components can be enhanced. Furthermore, a dead space in the device mounting space can be reduced, and thus a vehicle can be downsized.

The present invention also provides the input device of the vehicle brake system further comprising an attachment plate that enables attachment of the master cylinder and the stroke simulator to a dashboard of a vehicle, wherein a length of the attachment plate in the vehicle width direction is longer than a length of the attachment plate in a vehicle vertical direction (sixth aspect).

According to the sixth aspect of the present invention, the master cylinder and the stroke simulator are disposed in such a manner as to be provided side by side in a direction in which a length of the attachment plate in the vehicle width direction is longer, and thus the area of the attachment plate can be minimized. Accordingly, the attachment plate is applicable to the dashboard of gasoline-fueled vehicles which have no stroke simulator. That is, the fastening points of the conventional dashboard are available, and thus the general versatility of the dashboard is enhanced, resulting in a reduction of the manufacturing costs.

The present invention also provides the input device of the vehicle brake system wherein the attachment plate is provided with a thinned portion (seventh aspect).

According to the seventh aspect of the present invention, a weight saving of the attachment plate can be accomplished, thereby making the vehicle lightweight.

The present invention also provides the input device of the vehicle brake system further comprising: a recess formed between the master cylinder and the stroke simulator; and a through-hole for water drainage formed through the recess (eighth aspect).

According to the eighth aspect of the present invention, the input device into which an operation of a brake operating member is input; and an electric brake actuator which generates a brake fluid pressure based on at least an electric signal generated in accordance with the operation of the brake operating member are provided. Those are disposed in the device mounting space of the vehicle in a manner separated from each other, and thus the device can be downsized in comparison with a structure having those input device and electric brake actuator integrated together. Hence, the degree of freedom for the layout in the device mounting space formed at the front of the dashboard of the vehicle can be enhanced.

That is, in the device mounting space, as devices, in addition to the devices for a brake system, various units, such as a drive source (engine and/or driving motor), a transmission, a cooling system like radiator, and a low-voltage battery, are mounted. Accordingly, it is inevitably difficult to secure a large empty space (installation space). However, by employing a structure in which the input device and the electric brake actuator are configured as separate devices from each other as in the present invention, the respective sizes of the devices can be reduced, and thus it becomes unnecessary to secure a large empty space. Hence, individual devices can be mounted in a narrow empty space.

Moreover, by employing the structure in which the input device and the electric brake actuator are configured as separate devices from each other, the general versatility of each device can be enhanced, and the applicability of each device to various kinds of vehicles is enhanced.

Furthermore, since the input device and the electric brake actuator are separated from each other (as separate pieces), the electric brake actuator that is a source of noise and vibrations in some cases can be disposed so as to be apart from a driver, which prevents the driver from feeling strange (discomfort) due to noise and vibrations.

The input device has the recess formed between the master cylinder master cylinder that produces a fluid pressure in accordance with the input of the operation of the brake operating member and the stroke simulator that is provided side by side with the master cylinder and applies in a pseudo manner a force counteracting the operation of the brake operating member to the brake operating member. The recess removes an excess portion from between the master cylinder and the stroke simulator, thereby accomplishing weight saving.

Moreover, since the through-hole for water drainage is formed through the recess, even if water, etc., is accumulated in the recess, the water, etc., can be discharged from the recess through this through-hole. Hence, the input device can be obtained which permits the water, etc., to travel and which suppresses an accumulation of water.

Furthermore, a further weight saving can be accomplished by providing the through-hole. Since an accumulation of water is suppressed, rust prevention is accomplished.

The present invention also provides the input device of the vehicle brake system wherein a plurality of the through-holes are formed through the recess (ninth aspect).

According to the ninth aspect of the present invention, water, etc., accumulated in the recess can be appropriately discharged through the plurality of through-holes. Hence, the input device can be obtained which permits the water, etc., to travel and which further suppresses an accumulation of water.

Since the plurality of through-holes are provided, a further weight saving is accomplished. Moreover, an accumulation of water is further suppressed, a rust prevention effect is enhanced.

The present invention also provides the input device of the vehicle brake system wherein respective front end positions of a port of the master cylinder and a port of the stroke simulator formed so as to be in communication with each other substantially match each other (tenth aspect).

According to the tenth aspect of the present invention, the stroke simulator is provided side by side with the master cylinder extending in the vehicle back-and-forth direction in an integral manner, and the positions of the respective front ends of the port of the master cylinder and the port of the stroke simulator substantially match each other. Accordingly, the input device can be realized which is reduced in both width and length and thus downsized.

The present invention also provides the input device of the vehicle brake system wherein a brake fluid passage connecting together the respective ports of the master cylinder and the stroke simulator is formed so as to extend from the master cylinder and the stroke simulator toward respective lateral sides of the master cylinder and the stroke simulator (eleventh aspect).

According to the eleventh aspect of the present invention, the flow passage of the brake fluid connecting the respective ports can be shortened, and thus a further downsized input device can be realized.

The present invention also provides the input device of the vehicle brake system wherein the ports of the master cylinder and the stroke simulator are formed in respective upper portions of the master cylinder and the stroke simulator (twelfth aspect).

According to the twelfth aspect of the present invention, when a brake fluid is filled in the master cylinder and the stroke simulator and the air in the master cylinder and the stroke simulator is bled, filling of the brake fluid and air bleeding can be carried out efficiently.

The present invention also provides the input device of the vehicle brake system further comprising a valve unit including a stroke simulator cut-off valve that blocks a flow passing through the fluid pressure passage provided between the master cylinder and the stroke simulator, wherein the master cylinder, the stroke simulator, and the valve unit are formed integrally (thirteenth aspect).

According to the thirteenth aspect of the present invention, the fluid passage (fluid pressure passage) mutually connecting the master cylinder and the stroke simulator can be shortened, and thus the input device including those can be downsized. Moreover, the input device of a vehicle brake system downsized in this manner is appropriately mountable to hybrid vehicles and electric vehicles which have a little device-mounting space in comparison with gasoline-fueled vehicles. As a result, components can be made common between the gasoline-fueled vehicles, the hybrid vehicles, and the electric vehicles, and thus the general versatility of the components is enhanced, resulting in a reduction of manufacturing costs.

The present invention also provides the input device of the vehicle brake system wherein the stroke simulator, the master cylinder, and the valve unit are provided side by side in this order in a vehicle width direction (fourteenth aspect).

According to the fourteenth aspect of the present invention, in comparison with a structure in which, for example, the valve unit is provided between the master cylinder and the stroke simulator, the fluid passage between the master cylinder and the stroke simulator can be shortened, and the fluid passage between the master cylinder and the valve unit can be also shortened.

Effect of the Invention

According to the present invention, the piping between the master cylinder and the stroke simulator can be shortened, and thus the input device including the master cylinder and the stroke simulator can be downsized. The input device for a vehicle brake system downsized in this manner is appropriately mountable to hybrid vehicles and electric vehicles which have a little device-mounting space in comparison with gasoline-fueled vehicles. As a result, components can be made common between the gasoline-fueled vehicles, the hybrid vehicles, and the electric vehicles, and thus the general versatility of the components is enhanced, resulting in a reduction of manufacturing costs.

BRIEF DESCRIPTION OF DRAWINGS

FIG. 3A is a perspective view of the input device, and FIG. 3B is a plan view thereof.

FIG. 5A is a plan view from the rear of the vehicle, and FIG. 5B is a plan view from the front of the vehicle.

FIG. 14A is a perspective view, and FIG. 14B is a plan view from the top of a vehicle.

MODES FOR CARRYING OUT THE INVENTION

Embodiments will now be explained with reference to the accompanying drawings as needed.

Front, rear, up, down, right and left directions in the following explanation refer to front, rear, up, down, right and left directions illustrated in FIG. 1 that correspond to front, rear, up, down, right and left directions of a vehicle.

<Whole Structure>

Figure 1:
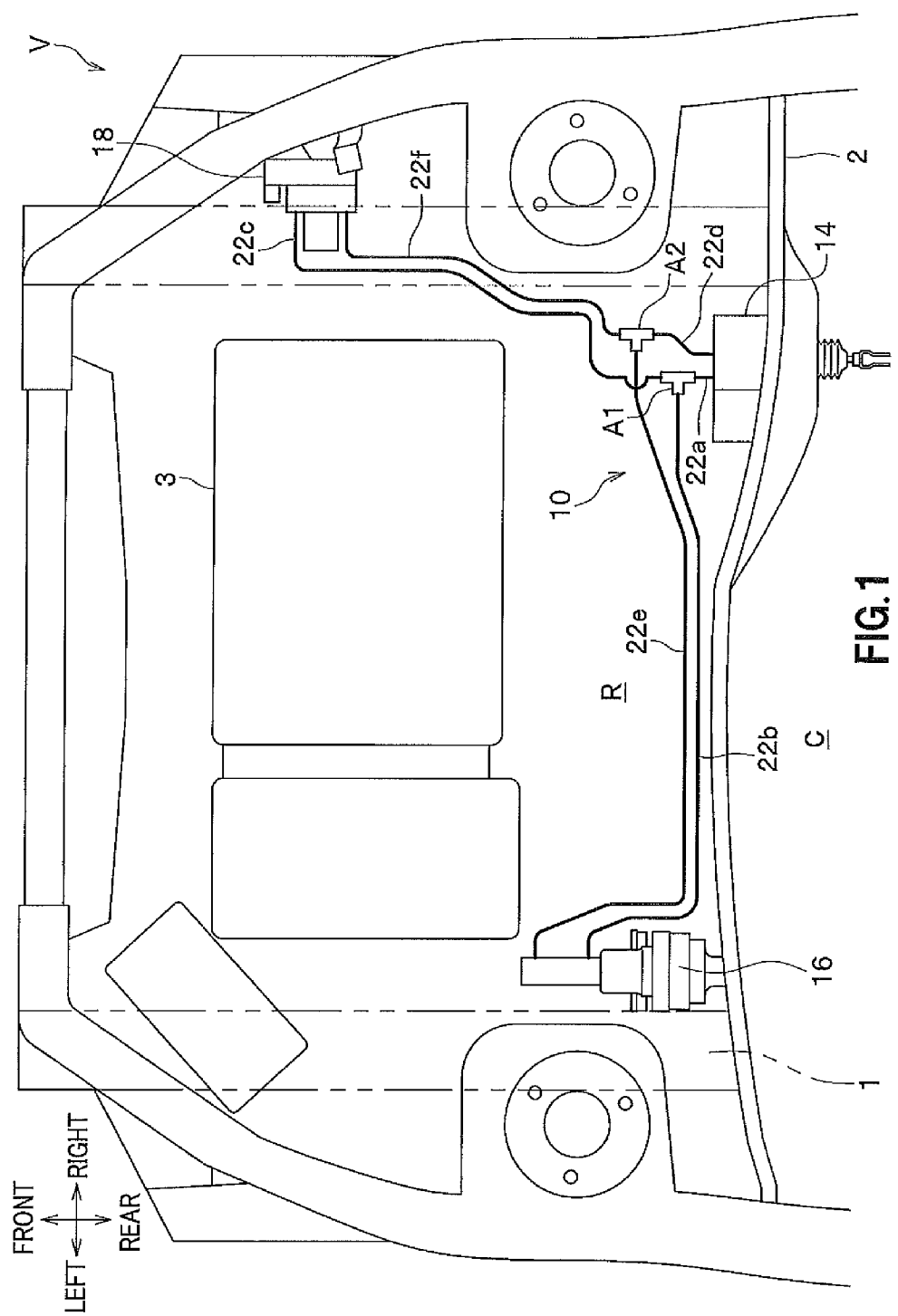
FIG. 1 is a partial enlarged plan view of a whole vehicle schematically illustrating a layout of components in a vehicle brake system according to the present embodiments.

A vehicle brake system 10 illustrated in FIG. 1 includes both of a by-wire brake system that transmits an electric signal to actuate a brake for a normal operation and a conventional hydraulic brake system that transmits a hydraulic pressure to actuate the brake for a fail safe operation.

Hence, the vehicle brake system 10 includes an input device 14 into which a brake operation given by an operator is input, a motor cylinder device 16 that is an electric brake actuator which generates a brake fluid pressure based on at least an electric signal in accordance with the brake operation, and a vehicle stability assist device 18 (hereinafter, referred to as a VSA device 18, note that VSA is a registered trademark) that is a vehicle behavior stabilizing device which assists the stabilization of a behavior of the vehicle based on the brake fluid pressure generated by the motor cylinder device 16.

The input device 14, the motor cylinder device 16, and the VSA device 18 are disposed separately from one another, but are in fluid communication with each other through piping tubes 22a to 22f, in a device mounting space R where devices 3 such as an engine and a driving motor are mounted, the device mounting space R provided ahead of a dashboard 2 of a vehicle V. Moreover, the input device 14 and the motor cylinder device 16 as components of the by-wire brake system are electrically connected to an unillustrated control means through unillustrated harnesses.

Figure 2:
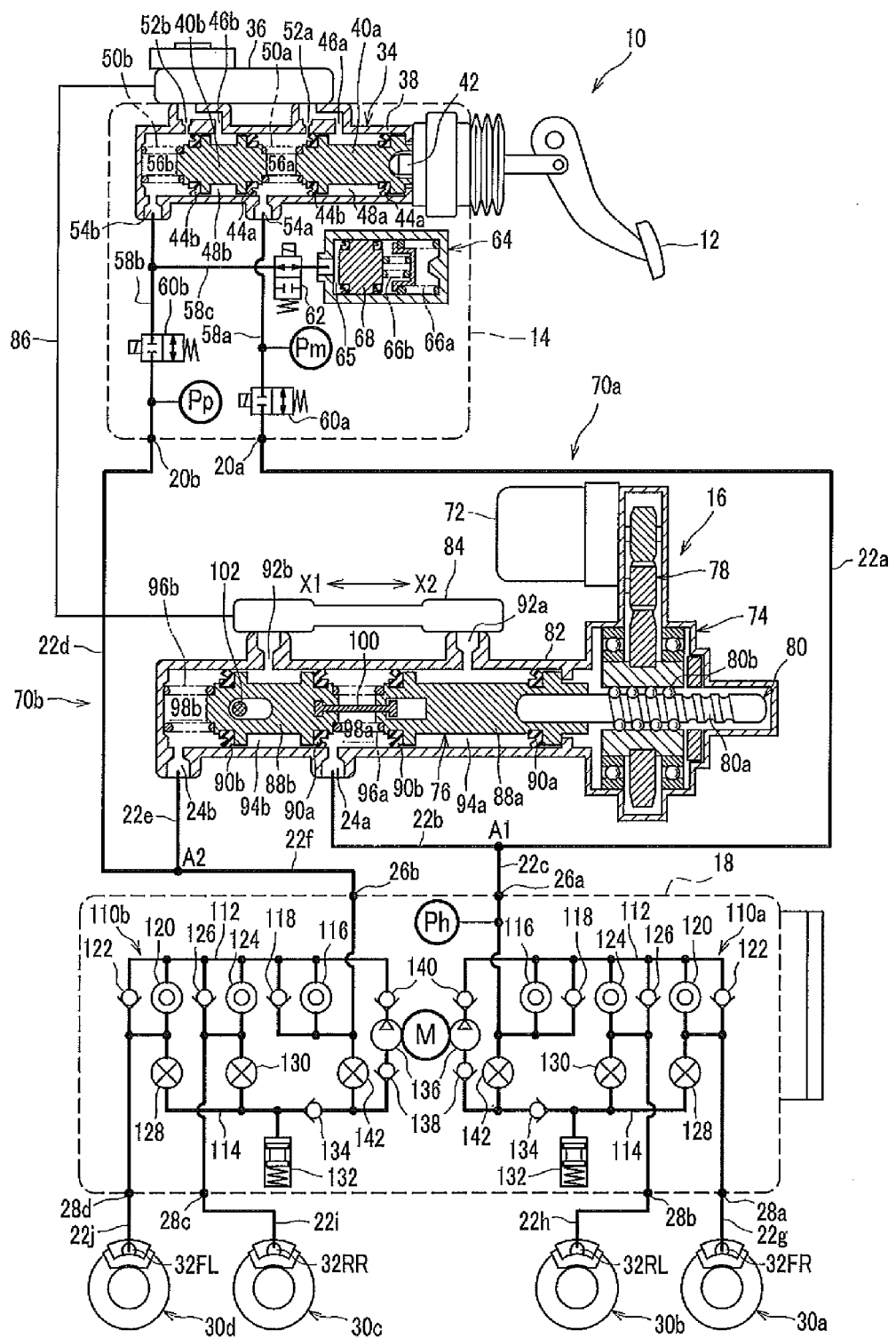
FIG. 2 is a schematic diagram illustrating a structure of the vehicle brake system according to the present embodiments.

FIG. 2 is a diagram illustrating a schematic configuration of the vehicle brake system 10.

An explanation will be given of fluid pressure passages. With reference to FIG. 2, a connection port 20a of the input device 14 is connected to a joint A1 through the first piping tube 22a, an output port 24a of the motor cylinder device 16 is connected to the joint A1 through the second piping tube 22b, and an inlet port 26a of the VSA device 18 is connected to the joint A1 through the third piping tube 22c.

With reference to FIG. 2, another connection port 20b of the input device 14 is connected to another joint A2 through the fourth piping tube 22d, another output port 24b of the motor cylinder device 16 is connected to the joint A2 through the fifth piping tube 22e, and another inlet port 26b of the VSA device 18 is connected to the joint A2 through the sixth piping tube 22f.

The VSA device 18 is provided with a plurality of outlet ports 28a to 28d. The first outlet port 28a is connected to a wheel cylinder 32FR of a disc brake mechanism 30a provided at the front right wheel through a seventh piping tube 22g. The second outlet port 28b is connected to a wheel cylinder 32FL of a disc brake mechanism 30b provided at the front left wheel through an eighth piping tube 22h. The third outlet port 28c is connected to a wheel cylinder 32RR of a disc brake mechanism 30c provided at the rear right wheel through a ninth piping tube 22i. The fourth outlet port 28d is connected to a wheel cylinder 32RL of a disc brake mechanism 30d provided at the rear left wheel through a tenth piping tube 22j.

In this case, a brake fluid is supplied to the respective wheel cylinders 32FR, 32FL, 32RR, and 32RL of the disc brake mechanisms 30a to 30d through the piping tubes 22g to 22j connected to the respective outlet ports 28a to 28d. The increase of the fluid pressure in the respective wheel cylinders 32FR, 32FL, 32RR, and 32RL actuates the respective wheel cylinders 32FR, 32FL, 32RR, and 32RL, and thus braking force is applied to the corresponding wheels (front-right wheel, front-left wheel, rear-right wheel, and rear-left wheel).

The vehicle brake system 10 is provided in a manner applicable to various vehicles, such as a vehicle driven by only an engine (internal combustion engine), a hybrid vehicle, an electric vehicle, and a fuel-cell vehicle.

The input device 14 includes a tandem master cylinder 34 that can produce a fluid pressure based on an operation given by the driver to a brake pedal 12, and a first reservoir 36 added to the master cylinder 34. Disposed slidably in a cylinder tube 38 of the master cylinder 34 are two pistons 40a and 40b distant from each other by a predetermined clearance along the axial direction of the cylinder tube 38.

The one piston 40a is disposed near the brake pedal 12, and is linked with the brake pedal 12 through a push rod 42. Moreover, the other piston 40b is disposed farther than the one piston 40a from the brake pedal 12.

A pair of piston packing 44a and 44b are attached to annular stepped portions formed on each of the respective outer circumferences of the one and other pistons 40a and 40b. Back chambers 48a and 48b in communication with supply ports 46a and 46b to be discussed later, respectively, are formed between the pair of piston packing 44a and 44b. Moreover, a spring 50a is provided between the one and other pistons 40a and 40b. Another spring 50b is provided between the other piston 40b and a side end of the cylinder tube 38.

The cylinder tube 38 of the master cylinder 34 is provided with the two supply ports 46a and 46b, two relief ports 52a and 52b, and two output ports 54a and 54b. In this case, each supply port 46a (46b) and each relief port 52a (52b) are provided so as to be merged together and be in communication with an unillustrated reservoir chamber in the first reservoir 36.

Moreover, provided inside the cylinder tube 38 of the master cylinder 34 are a first pressure chamber 56a and a second pressure chamber 56b that produce a brake fluid pressure in accordance with depression force given by the driver (operator) to the brake pedal 12. The first pressure chamber 56a is provided to be in communication with the connection port 20a through a first fluid pressure passage 58a, while the second pressure chamber 56b is provided to be in communication with the connection port 20b through a second fluid pressure passage 58b.

Provided between the master cylinder 34 and the connection port 20a are a pressure sensor Pm at the upstream side of the first fluid pressure passage 58a, and a first cut-off valve 60a at the downstream side of the first fluid pressure passage 58a which is a normally opened (usually opened) solenoid valve. The pressure sensor Pm detects a fluid pressure at the master cylinder 34 side upstream from the first cut-off valve 60a on the first fluid pressure passage 58a.

Provided between the master cylinder 34 and the connection port 20b are a second cut-off valve 60b at the upstream side of the second fluid pressure passage 58b which is a normally opened (usually opened) solenoid valve, and a pressure sensor Pp at the downstream side of the second fluid pressure passage 58b. The pressure sensor Pp detects a fluid pressure at the wheel cylinder 32FR, 32FL, 32RR, and 32RL side downstream from the second cut-off valve 60b on the second fluid pressure passage 58b.

The first cut-off valve 60a and the second cut-off valve 60b that are normally opened valves are held opened (usually opened) when not activated (when demagnetized (when no electrical power is supplied)). In FIG. 2, the first cut-off valve 60a and the second cut-off valve 60b are illustrated as being in the excited condition (the same is true of a third cut-off valve 62 to be discussed later).

A branched fluid pressure passage 58c branched from the second fluid pressure passage 58b is provided on the second fluid pressure passage 58b between the master cylinder 34 and the second cut-off valve 60b. The branched fluid pressure passage 58c has the third cut-off valve 62 that is a normally closed (usually closed) solenoid valve and a stroke simulator 64 connected in series. The third cut-off valve 62 that is a normally closed valve is held closed (usually closed) when not activated (when demagnetized (when no electrical power is supplied)).

The stroke simulator 64 is a device that produces a reactive force and a stroke in accordance with an operation of the brake pedal 12 when the first cut-off valve 60a and the second cut-off valve 60b block a flow. The stroke simulator 64 is connected to the master cylinder 34 through the above-explained branched fluid pressure passage 58c and second fluid pressure passage 58b. Moreover, the stroke simulator 64 is provided with a fluid pressure chamber 65 that is in communication with the branched fluid pressure passage 58c, and is provided so as to be capable of absorbing a brake fluid (brake fluid) supplied from the second pressure chamber 56b of the master cylinder 34 via the fluid pressure chamber 65.

Moreover, the stroke simulator 64 includes a first return spring 66a having a higher spring constant and a second return spring 66b having a smaller spring constant which are disposed in series, and a simulator piston 68 that is pressed by the first and second return springs 66a and 66b. The stroke simulator 64 operates in such a manner that the increase gradient of a counteracting force of the brake pedal 12 relative to the depression amount of the brake pedal 12 is lower for a first half of the maximum depression amount while it is larger for a second half of the maximum depression amount, so that the pedal feeling of the brake pedal 12 is enhanced.

There are fluid pressure passages that are included in a first fluid pressure system 70a and ones that are included in a second fluid pressure system 70b. The first fluid pressure system 70a connects the first pressure chamber 56a of the master cylinder 34 with the plurality of wheel cylinders 32FR and 32FL. The second fluid pressure system 70b connects the second pressure chamber 56b of the master cylinder 34 with the plurality of wheel cylinders 32RR and 32RL.

The first fluid pressure system 70a includes the first fluid pressure passage 58a that connects the output port 54a of the master cylinder 34 (cylinder tube 38) in the input device 14 with the connection port 20a, the piping tubes 22a and 22b that connect the connection port 20a of the input device 14 with the output port 24a of the motor cylinder device 16, the piping tubes 22b and 22c that connect the output port 24a of the motor cylinder device 16 with the inlet port 26a of the VSA device 18, and the piping tubes 22g and 22h that connect the outlet ports 28a and 28b of the VSA device 18 with the respective wheel cylinders 32FR and 32FL.

The second fluid pressure system 70b includes the second fluid pressure passage 58b that connects the output port 54b of the master cylinder 34 (cylinder tube 38) in the input device 14 with the connection port 20b, the piping tubes 22d and 22e that connect the connection port 20b of the input device 14 with the output port 24b of the motor cylinder device 16, the piping tubes 22e and 22f that connect the output port 24b of the motor cylinder device 16 with the inlet port 26b of the VSA device 18, and the piping tubes 22i and 22j that connect the outlet ports 28c and 28d of the VSA device 18 with the respective wheel cylinders 32RR and 32RL.

The motor cylinder device 16 includes an actuator mechanism 74 and a cylinder mechanism 76 pressed by the actuator mechanism 74. The actuator mechanism 74 has an electric motor 72 and a drive force transmission 73. The drive force transmission 73 of the actuator mechanism 74 includes a gear mechanism (a speed reduction mechanism) 78 that transmits the rotational drive force of the electric motor 72, and a ball-screw structure 80 including a ball-screw shaft 80a and balls 80b which convert the rotational drive force into linear drive force.

The cylinder mechanism 76 includes a substantially cylindrical cylinder main body 82, and a second reservoir 84 attached to the cylinder main body 82. The second reservoir 84 is connected with the first reservoir 36 attached to the master cylinder 34 of the input device 14 via a piping tube 86, and is provided in such a manner that the brake fluid reserved in the first reservoir 36 is supplied to the interior of the second reservoir 84 through the piping tube 86.

Disposed slidably in the cylinder main body 82 are a first slave piston 88a and a second slave piston 88b distant from each other by a predetermined clearance along the axial direction of the cylinder main body 82. The first slave piston 88a is disposed near the ball-screw structure 80 and linked with one end of the ball-screw shaft 80a so as to be displaced integrally with the ball-screw shaft 80a in the direction of an arrow X1 or X2. Moreover, the second slave piston 88b is disposed farther than the first slave piston 88a from the ball-screw structure 80.

A pair of slave piston packing 90a and 90b are attached to annular stepped portions formed on each of the respective outer circumferences of the first and second slave pistons 88a and 88b. A first back chamber 94a and a second back chamber 94b that are in communication with respective reservoir ports 92a and 92b to be discussed later are formed between the pair of slave piston packing 90a and 90b. A first return spring 96a is disposed between the first and second slave pistons 88a and 88b, and a second return spring 96b is disposed between the second slave piston 88b and a side end of the cylinder main body 82.

The cylinder main body 82 of the cylinder mechanism 76 is provided with the two reservoir ports 92a and 92b, and the two output ports 24a and 24b. In this case, the reservoir ports 92a (92b) is provided in such a manner as to be in communication with an unillustrated reservoir chamber in the second reservoir 84.

Provided in the cylinder main body 82 are a first fluid pressure chamber 98a that produces a brake fluid pressure output to the wheel cylinders 32FR and 32FL through the output port 24a, and a second fluid pressure chamber 98b that produces a brake fluid pressure output to the wheel cylinders 32RR and 32RL through the output port 24b.

Regulation means 100 for regulating the maximum distance and minimum distance between the first slave piston 88a and the second slave piston 88b is provided between the first slave piston 88a and the second slave piston 88b. Moreover, a stopper pin 102 which regulates the slidable range of the second slave piston 88b to prevent the over return of the second slave piston 88b toward the first slave piston 88a is provided on the second slave piston 88b.

The VSA device 18 is a well-known device, and includes a first brake system 110a that controls the first fluid pressure system 70a connected to the disc brake mechanisms 30a and 30b (wheel cylinder 32FR and wheel cylinder 32FL) of the front right wheel and the front left wheel, and a second brake system 110b that controls the second fluid pressure system 70b connected to the disc brake mechanisms 30c and 30d (wheel cylinder 32RR and wheel cylinder 32RL) of the rear right wheel and the rear left wheel. The first brake system 110a may be a fluid pressure system connected to the disc brake mechanisms of the front left wheel and the rear right wheel, and the second brake system 110b may be the fluid pressure system connected to the disc brake mechanisms of the front right wheel and the rear left wheel. Moreover, the first brake system 110a may be a fluid pressure system connected to the disc brake mechanism of the front right wheel and the rear right wheel provided at the one side of a vehicle body, and the second brake system 110b may be a fluid pressure system connected to the disc brake mechanisms of the front left wheel and the rear left wheel provided at the other side of the vehicle body.

The first brake system 110a and the second brake system 110b are of the same structure, and thus the corresponding components between the first brake system 110a and the second brake system 110b are denoted by the same reference numeral. The explanation will be mainly given of the first brake system 110a, and the explanation of the second brake system 110b will be additionally given in parentheses accordingly.

The first brake system 110a (second brake system 110b) has a first common fluid pressure passage 112 and a second common fluid pressure passage 114 common to the wheel cylinders 32FR and 32FL (32RR and 32RL). The VSA device 18 includes a regulator valve 116 that is a normally opened solenoid valve disposed between the inlet port 26a and the first common fluid pressure passage 112, a first check valve 118 which is disposed in parallel with the regulator valve 116, and which permits the brake fluid to flow from the inlet port 26a side to the first common fluid pressure passage 112 side (prevents the brake fluid from flowing from the first common fluid pressure passage 112 side to the inlet port 26a side), a first in-valve 120 that is a normally opened solenoid valve disposed between the first common fluid pressure passage 112 and the first outlet port 28a, a second check valve 122 which is disposed in parallel with the first in-valve 120 and which permits the brake fluid to flow from the first outlet port 28a side to the first common fluid pressure passage 112 side (prevents the brake fluid from flowing from the first common fluid pressure passage 112 side to the first outlet port 28a side), a second in-valve 124 that is a normally opened solenoid valve disposed between the first common fluid pressure passage 112 and the second outlet port 28b, and a third check valve 126 which is disposed in parallel with the second in-valve 124 and which permits the brake fluid to flow from the second outlet port 28b side to the first common fluid pressure passage 112 side (prevents the brake fluid from flowing from the first common fluid pressure passage 112 side to the second outlet port 28b side).

Moreover, the VSA device 18 includes a first out-valve 128 that is a normally closed solenoid valve disposed between the first outlet port 28a and the second common fluid pressure passage 114, a second out-valve 130 that is a normally closed solenoid valve disposed between the second outlet port 28b and the second common fluid pressure passage 114, a reservoir 132 connected to the second common fluid pressure passage 114, a fourth check valve 134 which is disposed between the first common fluid pressure passage 112 and the second common fluid pressure passage 114 and which permits the brake fluid to flow from the second common fluid pressure passage 114 side to the first common fluid pressure passage 112 side (prevents the brake fluid from flowing from the first common fluid pressure passage 112 side to the second common fluid pressure passage 114 side), a pump 136 which is disposed between the fourth check valve 134 and the first common fluid pressure passage 112 and which supplies the brake fluid from the second common fluid pressure passage 114 side to the first common fluid pressure passage 112 side, a fifth check valve 138 and a sixth check valve 140 which are provided with the pump 136 interposed therebetween and which permit the brake fluid to flow from the second common fluid pressure passage 114 side to the first common fluid pressure passage 112 side (prevent the brake fluid from flowing from the first common fluid pressure passage 112 side to the second common fluid pressure passage 114 side), a motor M that actuates the pump 136, and a seventh check valve 142 which is disposed between the second common fluid pressure passage 114 and the inlet port 26a, and which permits the brake fluid to flow from the inlet port 26a side to the second common fluid pressure passage 114 side (prevents the brake fluid from flowing from the second common fluid pressure passage 114 side to the inlet port 26a side).

In the first brake system 110a, a pressure sensor Ph is provided at a location near the inlet port 26a on the fluid pressure passage for detecting a brake fluid pressure which is output through the output port 24a of the motor cylinder device 16 and which is produced in the first fluid pressure chamber 98a of the motor cylinder device 16. Detection signals based on respective detections by the pressure sensors Pm, Pp, and Ph are supplied to an unillustrated control means.

The vehicle brake system 10 of the present embodiments basically employs the above-explained structure, and functions and advantages thereof will be explained below.

In the normal operation condition in which the vehicle brake system 10 operates normally, the first cut-off valve 60a and the second cut-off valve 60b each of which is a normally opened solenoid valve is closed by excitation, and the third cut-off valve 62 which is a normally closed solenoid valve is opened by excitation (see FIG. 2). Hence, the first cut-off valve 60a and the second cut-off valve 60b block the first fluid pressure system 70a and the second fluid pressure system 70b, and thus no brake fluid pressure produced by the master cylinder 34 of the input device 14 is transmitted to the respective wheel cylinders 32FR, 32FL, 32RR, and 32RL of the disc brake mechanisms 30a to 30d.

At this time, the brake fluid pressure produced by the second pressure chamber 56b of the master cylinder 34 is transmitted to the fluid pressure chamber 65 of the stroke simulator 64 through the branched fluid pressure passage 58c and the third cut-off valve 62 that is held opened. The brake fluid pressure supplied to the fluid pressure chamber 65 causes the simulator piston 68 to be displaced against the spring forces of the return springs 66a and 66b. Accordingly, the stroke operation of the brake pedal 12 is permitted and pseudo pedal reaction force is generated and is applied to the brake pedal 12. As a result, the driver can obtain a brake feeling that he/she is accustomed to.

When the system is in the above-described state, when detecting the depression of the brake pedal 12 by the driver, the unillustrated control means actuates the electric motor 72 of the motor cylinder device 16 to depress the actuator mechanism 74, and thus the first slave piston 88a and the second slave piston 88b are displaced toward the direction of an arrow X1 in FIG. 2 against the spring forces of the first return spring 96a and the second return spring 96b. The respective displacements of the first slave piston 88a and the second slave piston 88b pressurize the brake fluid in the first fluid pressure chamber 98a and the second fluid pressure chamber 98b, and thus a desired brake fluid pressure is produced.

The brake fluid pressure of the first fluid pressure chamber 98a in the motor cylinder device 16 and of the second fluid pressure chamber 98b therein is transmitted to the respective wheel cylinders 32FR, 32FL, 32RR, and 32RL of the disc brake mechanisms 30a to 30d through the first and second in-valves 120 and 124 of the VSA device 18 that are held opened, to actuate the respective wheel cylinders 32FR, 32FL, 32RR, and 32RL, thereby applying desired braking force to the respective wheels.

In other words, according to the vehicle brake system 10 of the present embodiments, in a normal operation condition in which the motor cylinder device 16 serving as the electric brake actuator (power source for generating fluid pressure) and the control means such as an unillustrated ECU performing by-wire control are operable, a so-called brake-by-wire brake system is activated which causes the disc brake mechanisms 30a to 30d to be actuated by the brake fluid pressure produced by the motor cylinder device 16 with a communication between the master cylinder 34 that produces the brake fluid pressure when the driver depresses the brake pedal 12 and the disc brake mechanisms 30a to 30d (wheel cylinders 32FR, 32RL, 32RR, and 32FL) that control the respective wheels being cut off by the first cut-off valve 60a and the second cut-off valve 60b. Hence, according to the present embodiments, the present invention can be suitably applied to a vehicle such as an electric vehicle which has no vacuum brake booster, etc., conventionally used.

Conversely, in the abnormal operation condition in which the motor cylinder device 16, etc., becomes inoperable, a so-called conventional hydraulic brake system is activated which causes the first cut-off valve 60a and the second cut-off valve 60b to be opened, respectively, and which transmits the brake fluid pressure produced by the master cylinder 34 to the disc brake mechanisms 30a to 30d (wheel cylinders 32FR, 32FL, 32RR, and 32RL), thereby actuating the disc brake mechanisms 30a to 30d (wheel cylinders 32FR, 32FL, 32RR, and 32RL).

(Input Device 14)

Next, an explanation will be given of specific structures of the input device 14 with reference to five embodiments. That is, input devices 14A to 14E as example input devices 14 will be explained.

First Embodiment

Figure 3A:
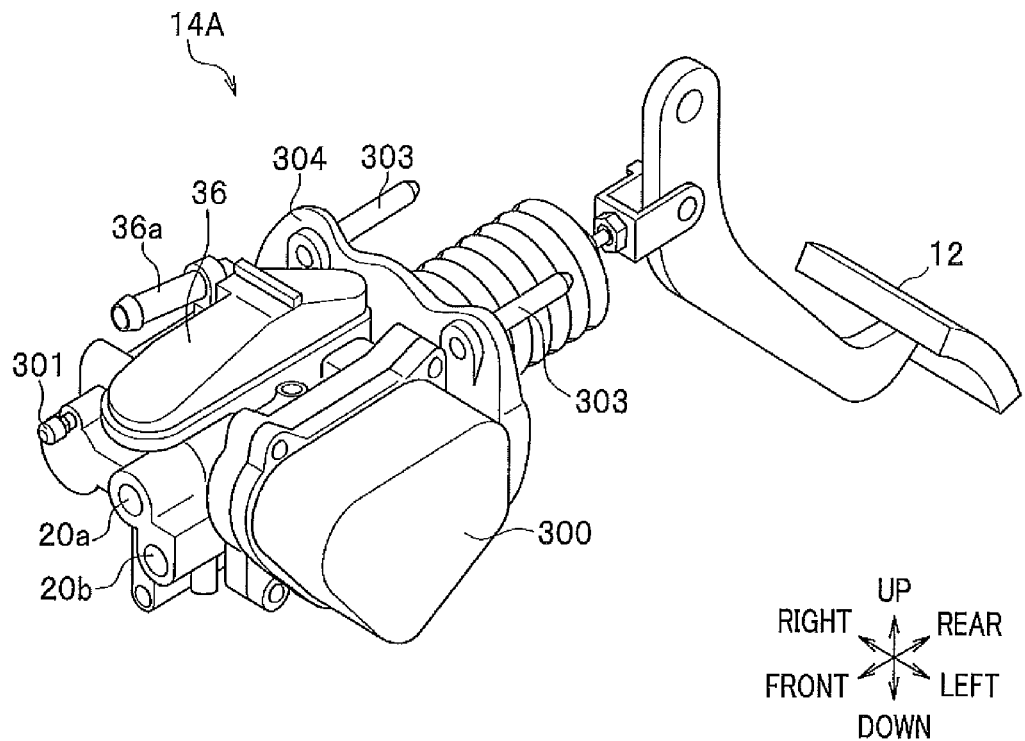
FIGS. 3A and 3B are schematic enlarged views of an input device of a vehicle brake system according to a first embodiment.
Figure 3B:
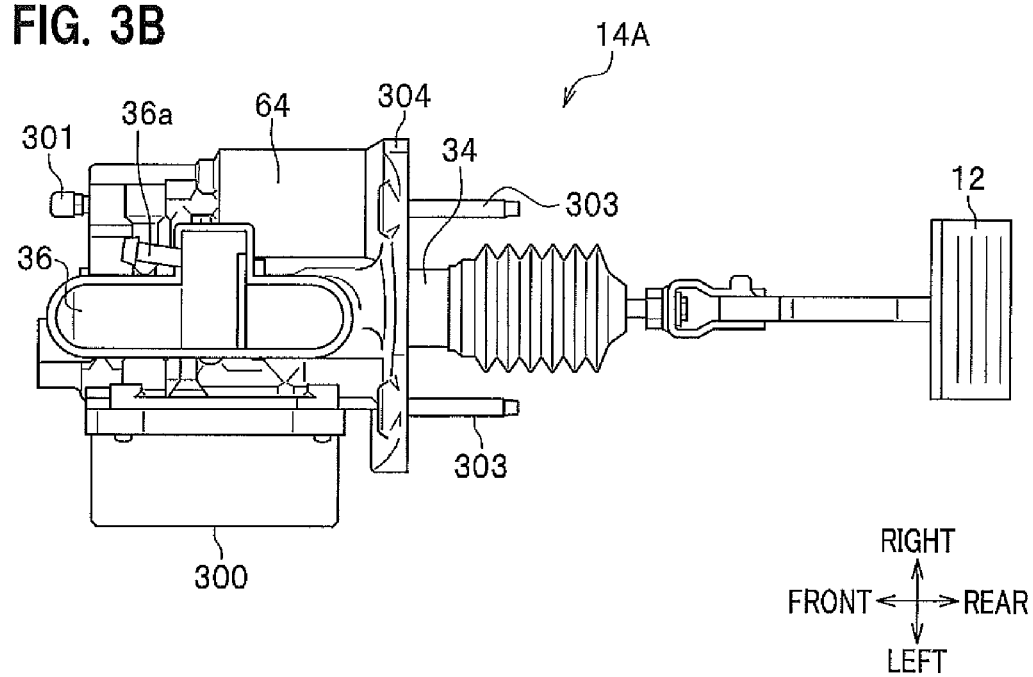
Figure 4:
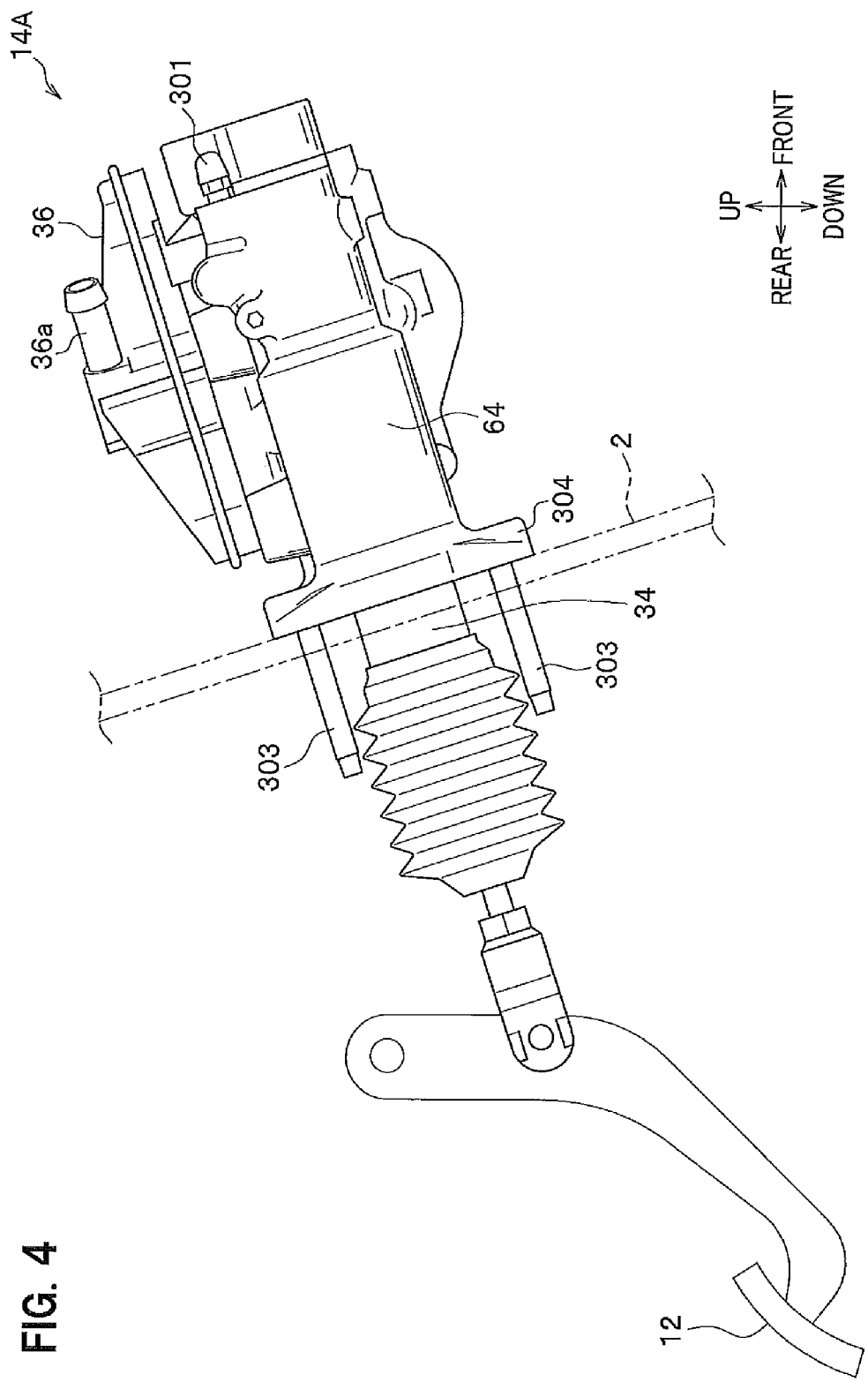
FIG. 4 is a schematic diagram illustrating how the input device of the vehicle brake system is fastened to a dashboard of a vehicle according to the first embodiment.

FIGS. 3A and 3B are schematic perspective view of the input device 14A, and the same component as one illustrated in FIG. 2 will be denoted by the same reference numeral in FIGS. 3A to 4, and the detailed explanation will be omitted.

As illustrated in FIGS. 3A and 3B, the input device 14A includes the master cylinder 34, the stroke simulator 64, and the first reservoir (reservoir tank) 36 (including a connection port 36a to be connected with the piping tube 86 (see FIG. 2)) all integrated together. According to the input device 14A of the first embodiment, a sensor valve unit 300, the master cylinder 34, and the stroke simulator 64 are arranged side by side in this order in the width direction of the vehicle, and are fastened to an attachment plate (stud plate) 304.

FIGS. 3A and 3B illustrate the input device 14A having the brake pedal (brake operating member) 12 connected with the master cylinder 34.

The input device 14A includes, as explained above, the connection port 20a (first connection port) that is in communication with the master cylinder 34 via the first fluid pressure passage 58a (see FIG. 2), and the connection port 20b (second connection port) that is in communication with the master cylinder 34 via the second fluid pressure passage 58b (see FIG. 2). Furthermore, it is not illustrated in FIGS. 3A and 3B but the input device 14A includes the branched fluid pressure passage 58c branched from the second fluid pressure passage 58b.

Provided in the halfway of the first fluid pressure passage 58a, the second fluid pressure passage 58b, and the branched fluid pressure passage 58c are the first cut-off valve 60a, the second cut-off valve 60b, the third cut-off valve 62, and, the pressure sensor Pm (first fluid pressure sensor) and the pressure sensor Pp (second fluid pressure sensor) as illustrated in FIG. 2.

The sensor valve unit 300 retains electric circuits for controlling the first cut-off valve 60a, the second cut-off valve 60b, and the third cut-off valve 62, and, the pressure sensor Pm and the pressure sensor Pp. The casing of the sensor valve unit 300 is formed of resin, and by forming the casing of the sensor valve unit 300 of resin or the like that is more brittle than metal, when shock is applied to the input device 14A, the casing of the sensor valve unit 300 can absorb the shock. Moreover, the resin-made sensor valve unit 300 contributes to weight saving of the input device 14A.

Furthermore, the sensor valve unit 300 is formed in a tapered shape in the direction toward the bottom of the vehicle, and this shape facilitates detachment of the input device 14A from the vehicle.

The input device 14A is provided with an air bleeder 301 for bleeding the air out of at least the master cylinder 34 and the stroke simulator 64. The air bleeder 301 will be discussed later with reference to FIG. 4.

The attachment plate 304 is fastened with the master cylinder 34 and the stroke simulator 64 integrated side by side, and is formed so as to have an edge curved in the vertical and horizontal directions of the vehicle. The attachment plate 304 is provided with fasteners 303 to be fastened to, for example, a dashboard.

The attachment plate 304 is longer in the width direction of the vehicle than in the vertical direction of the vehicle. By employing such dimensions, the master cylinder 34 and the stroke simulator 64 can be arranged side by side in the vehicle width direction in which the attachment plate has a longer length. Moreover, the attachment plate 304 can be fastened using conventional fastening points of the dashboard that a gasoline-fueled vehicle, etc., has.

Furthermore, the input device 14A is provided with the first reservoir 36 added so as to partially overlap the master cylinder 34 and the stroke simulator 64 in the vertical direction. The first reservoir 36 has an external shape elongated in the back-and-forth direction. By adding the first reservoir 36 in this manner to the master cylinder 34 and the stroke simulator 64, space saving in the device mounting space can be accomplished.

FIG. 4 schematically illustrates how the input device 14A is disposed on a dashboard 2 of the vehicle. As illustrated in FIG. 4, the input device 14A has the fasteners (stud bolts) 303 fastened to the dashboard 2. Moreover, the input device 14A is disposed in such manner that a part of the master cylinder 34 protrudes toward the rear of the vehicle (i.e., in the interior of the vehicle).

The input device 14A is fastened to the dashboard 2 in such a manner that the front of the input device 14A is located at a higher position than the rear thereof. That is, the input device 14A is fastened to the dashboard 2 in such a manner that the air bleeder 301 is located at a higher position.

By fastening the input device 14A in such a manner that the front of the input device 14A is located at a higher position, it becomes possible to bleed the air from inside at least the master cylinder 34 and the stroke simulator 64 through the air bleeder 301. By disposing the input device 14A to the dashboard in this manner, an input to the input device 14A through an operation of the brake pedal 12 can be ensured.

As illustrated in FIGS. 3A to 4, according to the input device 14A, the master cylinder 34 is formed integrally with the stroke simulator 64. By configuring the input device 14A in this manner, a piping between at least the master cylinder 34 and the stroke simulator 64 can be made as short as possible. Accordingly, the input device 14A can be downsized. As a result, it becomes also possible for electric vehicles and hybrid vehicles, etc., having a limited mounting space in comparison with gasoline-fueled vehicles to mount the input device 14A of the first embodiment. Accordingly, components can be made common to, for example, gasoline-fueled vehicles, electric vehicles, and hybrid vehicles, thereby reducing the production costs.

Second Embodiment

Next, an explanation will be given of a structure of the input device 14B according to a second embodiment with reference to FIGS. 5A to 7.

Figure 5A:
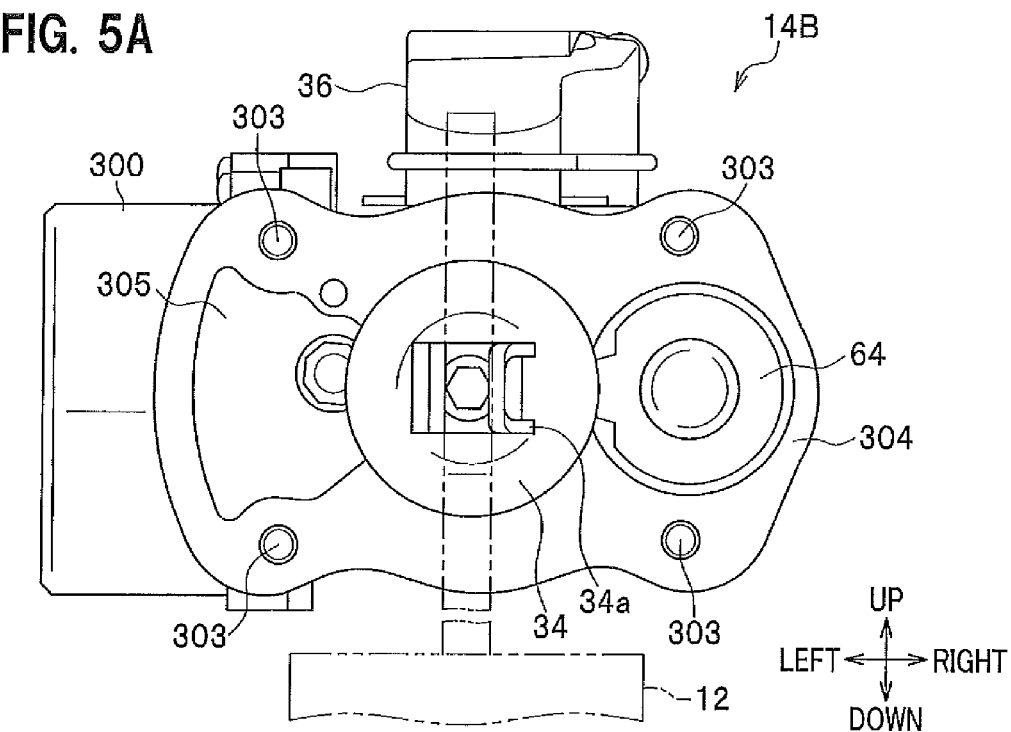
FIGS. 5A and 5B are schematic enlarged views of an input device of a vehicle brake system according to a second embodiment.
Figure 5B:
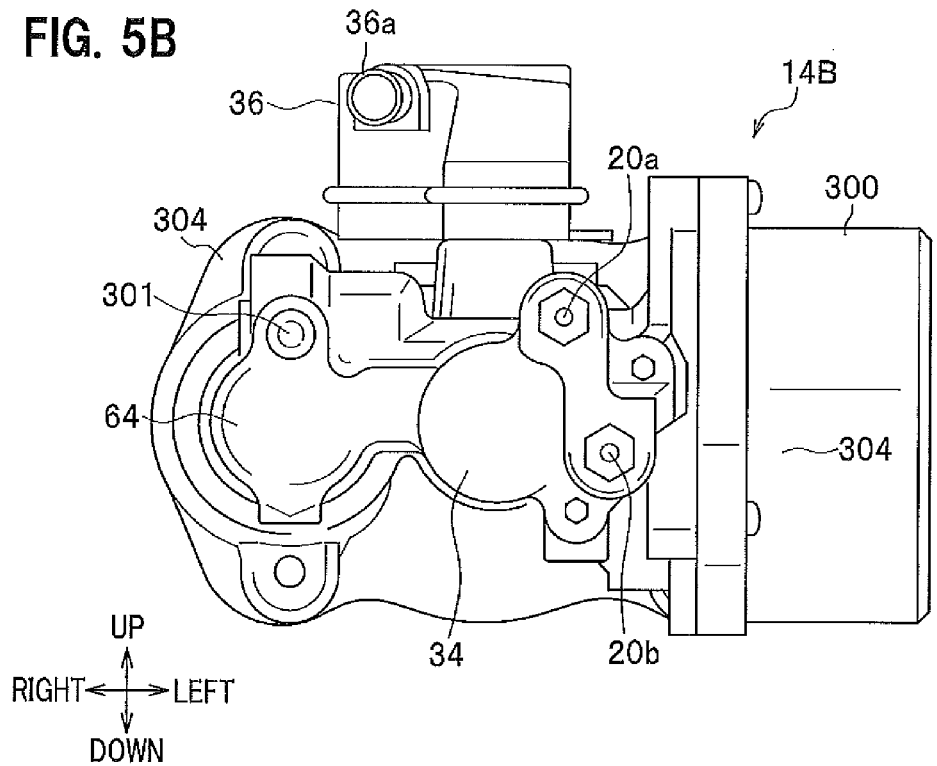
Figure 6:
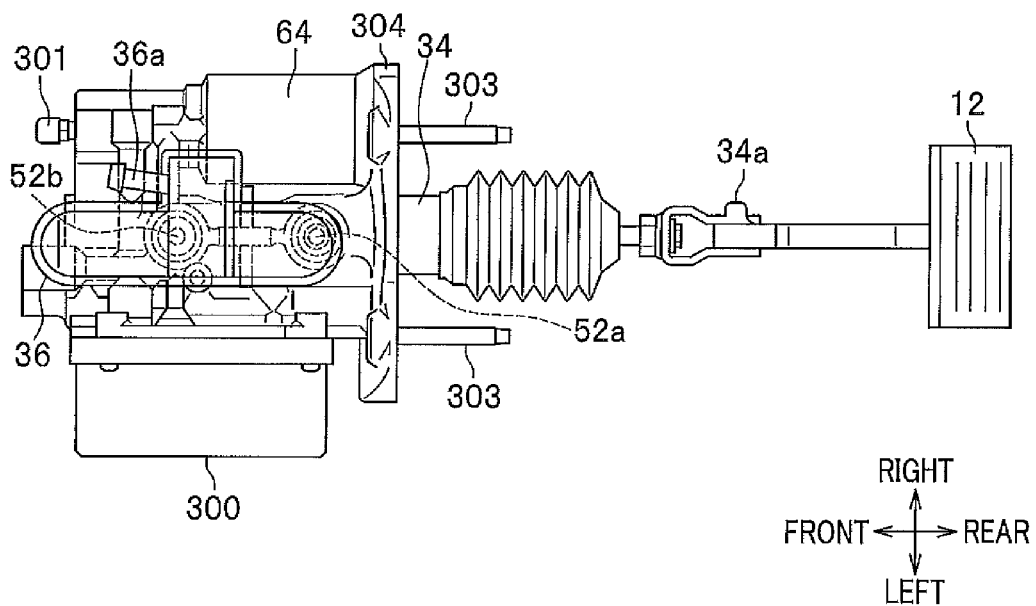
FIG. 6 is a top side view of the input device of the vehicle brake system according to the second embodiment.
Figure 7:
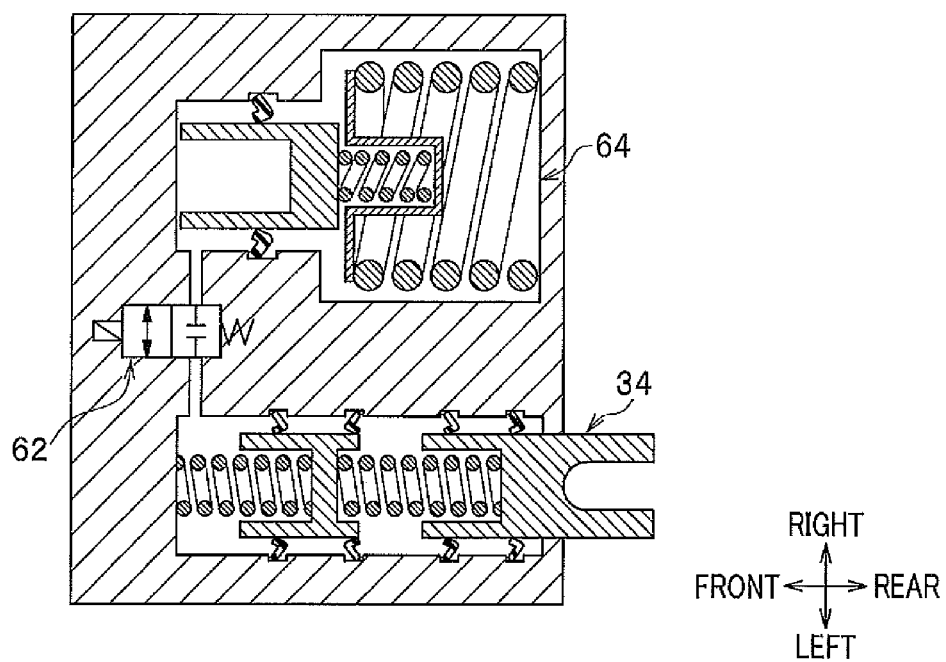
FIG. 7 is a diagram schematically illustrating a connection relationship between a master cylinder and a stroke simulator in the input device of the vehicle brake system according to the second embodiment.

FIGS. 5A and 5B are schematic enlarged views of the input device of the vehicle brake system according to the second embodiment. FIG. 5A is a plan view from the rear of the vehicle, and FIG. 5B is a plan view from the front thereof. Moreover, FIG. 6 is an upper side view of the input device of the vehicle brake system according to the second embodiment. Furthermore, FIG. 7 is a diagram schematically illustrating a connection relationship between the master cylinder and the stroke simulator in the input device of the vehicle brake system according to the second embodiment.

In FIGS. 5A to 7, the same component as that in FIG. 2 will be denoted by the same reference numeral, and the detailed explanation will be omitted.

As illustrated in FIG. 5A, the input device 14B has the master cylinder 34 and the stroke simulator 64 that are secured to the attachment plate (stud plate) 304 and that are arranged side by side in the vehicle width direction in an integral manner. Moreover, around the master cylinder 34, a thinned portion 305 formed by thinning the attachment plate 304 so as to match the shape of the attachment plate 304 is provided at the opposite side to the stroke simulator 64. The four fasteners (stud bolts) 303 which fasten the attachment plate 304 having the master cylinder 34, etc., fastened thereto to, for example, the dashboard 2 and which extend in the vehicle forward direction are provided. A linkage 34a is provided at the tip of a pushrod extending from the master cylinder 34 toward the brake pedal (brake operating member) 12, and the linkage 34a is coupled with the brake pedal 12.

Moreover, provided above the master cylinder 34 and the stroke simulator 64 and between the master cylinder 34 and the stroke simulator 64 is the first reservoir 36 (including the connection port 36a to be connected with the piping tube 86) having an external shape elongated in the back-and-forth direction. By providing the first reservoir 36 at this location, space saving in the device mounting space can be accomplished. Moreover, in the vehicle frontward side of the attachment plate 304 and at the opposite side of the master cylinder 34 to the stroke simulator 64, the sensor valve unit 300 is provided in a manner integral with the master cylinder 34 and the stroke simulator 64.

The connection port 36a and the second reservoir 84 (see FIG. 2) may be directly connected together via the piping tube 86, but in accordance with the mounting layout of the vehicle, a separate tank may be provided between the connection port 36a and the second reservoir 84. When a separate tank is provided, the connection port 36a is connected to the separate tank.

Moreover, as illustrated in FIG. 5B, in the input device 14B, the air bleeder 301 for bleeding the air out of at least the master cylinder 34 and the stroke simulator 64 is provided at the vehicle rearward side of the stroke simulator 64.

Furthermore, as explained above, the input device 14B includes the connection port 20a (first connection port) that is in communication with the master cylinder 34 via the first fluid pressure passage 58a (see FIG. 2), and the connection port 20b (second connection port) that is in communication with the master cylinder 34 via the second fluid pressure passage 58b (see FIG. 2). It is not illustrated in FIGS. 5A and 5B but the input device 14B also includes the branched fluid pressure passage 58c branched from the second fluid pressure passage 58b.

The first cut-off valve 60a, the second cut-off valve 60b, and the third cut-off valve 62, and, the pressure sensor Pm (first fluid pressure sensor) and the pressure sensor Pp (second fluid pressure sensor) are provided in the halfway of the first fluid pressure passage 58a, the second fluid pressure passage 58b, and the branched fluid pressure passage 58c as illustrated in FIG. 2.

The sensor valve unit 300 retains electric circuits for controlling the first cut-off valve 60a, the second cut-off valve 60b, and the third cut-off valve 62, and, the pressure sensor Pm and the pressure sensor Pp. The casing of the sensor valve unit 300 is formed of resin, and by forming the casing of the sensor valve unit 300 of resin or the like that is more brittle than metal, when shock is applied to the input device 14B, the casing of the sensor valve unit 300 can absorb the shock. Moreover, the resin-made sensor valve unit 300 contributes to weight saving of the input device 14B.

Furthermore, the sensor valve unit 300 is formed in a tapered shape in the direction toward the bottom of the vehicle, and this shape facilitates detachment of the input device 14B from the vehicle.

The air bleeder 301 is to bleed the air out of at least the master cylinder 34 and the stroke simulator 64. The air bleeder 301 is provided at a portion of the input device 14B highest when the input device is fastened to, for example, the dashboard 2 of the vehicle. By fastening the input device 14B in such a manner that the front of the input device 14B is located at a higher position, the air in the master cylinder 34, etc., can be bled through the air bleeder 301. The air bleeder 301 may be provided at a portion where the air in the master cylinder 34 and the stroke simulator 64, etc., gathers or a portion where the air is collected due to the configurations of the fluid pressure passages, such as the upper front of the master cylinder 34 or the lower front thereof.

The attachment plate 304 is secured with the master cylinder 34 and the stroke simulator 64 disposed side by side in an integral manner, and is formed so as to have an edge curved in the vertical and horizontal directions of the vehicle. The attachment plate 304 has a length in the vehicle width direction longer than the length in the vehicle vertical direction. By employing such dimensions, the master cylinder 34 and the stroke simulator 64 can be provided side by side in the vehicle width direction in which the attachment plate has a longer length. Moreover, the attachment plate 304 can be fastened using conventional fastening points of the dashboard of gasoline-fueled vehicles, etc.

Moreover, as explained above, the attachment plate 304 is provided with the thinned portion 305. According to the second embodiment, the thinned portion is formed between the two fasteners 303 located at the left of the vehicle and along the edge of the attachment member 304. By providing such a thinned portion 305, the vehicle can accomplish weight saving.

FIG. 6 is an upper side view of the input device 14B, and FIG. 7 is a diagram schematically illustrating the connection relationship between the master cylinder 34 and the stroke simulator 64. In FIG. 7, in order to simplify the illustration, the master cylinder 34 and the stroke simulator 64 are connected through a fluid pressure passage that is of the shortest length, and the third cut-off valve 62 is provided in the halfway of the fluid pressure passage. Moreover, the third cut-off valve illustrated in FIG. 7 is in a closed condition.

As illustrated in FIG. 6, according to the second embodiment, the sensor valve unit 300, the master cylinder 34, and the stroke simulator 64 are provided side by side in this order from the left of the vehicle to the right thereof. Moreover, the first reservoir 36 is connected to the master cylinder 34 through the connection ports in communication with the relief ports 52a and 52b (see FIG. 2) provided in the master cylinder 34.

According to the second embodiment, as illustrated in FIG. 7, the location of a port of the master cylinder 34 is provided so as to match the location of a port of the stroke simulator 64 in the back-and-forth direction. By disposing the master cylinder 34 and the stroke simulator 64 in this manner, the fluid passage provided therebetween can be shortest, thereby downsizing the input device 14B.

As illustrated in FIGS. 5A to 7, in the input device 14B, the master cylinder 34 and the stroke simulator 64 are integrally provided side by side in the vehicle width direction. When the input device 14B employs the above structure, at least the fluid passage between the master cylinder 34 and the stroke simulator 64 can be minimized, thereby downsizing the input device 14B. As a result, the input device 14B of the second embodiment can be mounted on electric vehicles and hybrid vehicles, etc., having a limited mounting space in the device mounting space in comparison with gasoline-fueled vehicles.

Moreover, the input device 14B of the second embodiment can be installed on a conventional dashboard used in gasoline-fueled vehicles, etc. Hence, components can be made common to, for example, gasoline-fueled vehicles, electric vehicles, and hybrid vehicles, thereby reducing the manufacturing costs.

Third Embodiment

Next, an explanation will be given of a structure of the input device 14C according to a third embodiment with reference to FIGS. 8A to 11B.

Figure 8A:
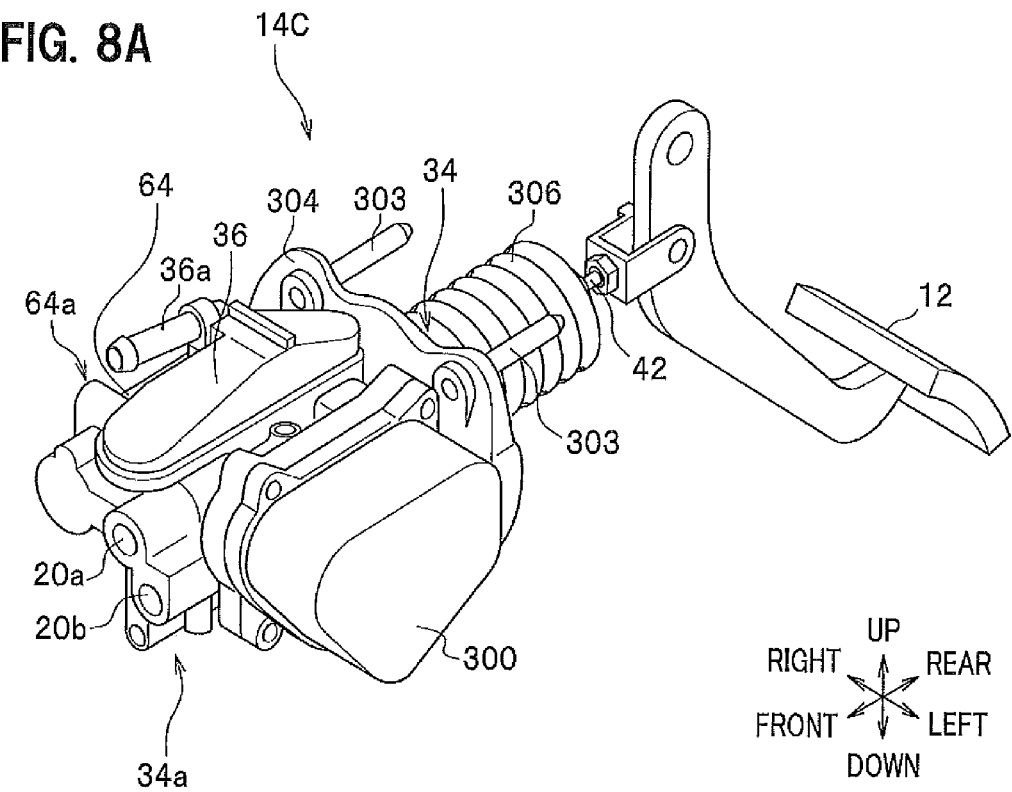
FIG. 8A is a schematic perspective view of an input device of a vehicle brake system according to a third embodiment.
Figure 8B:
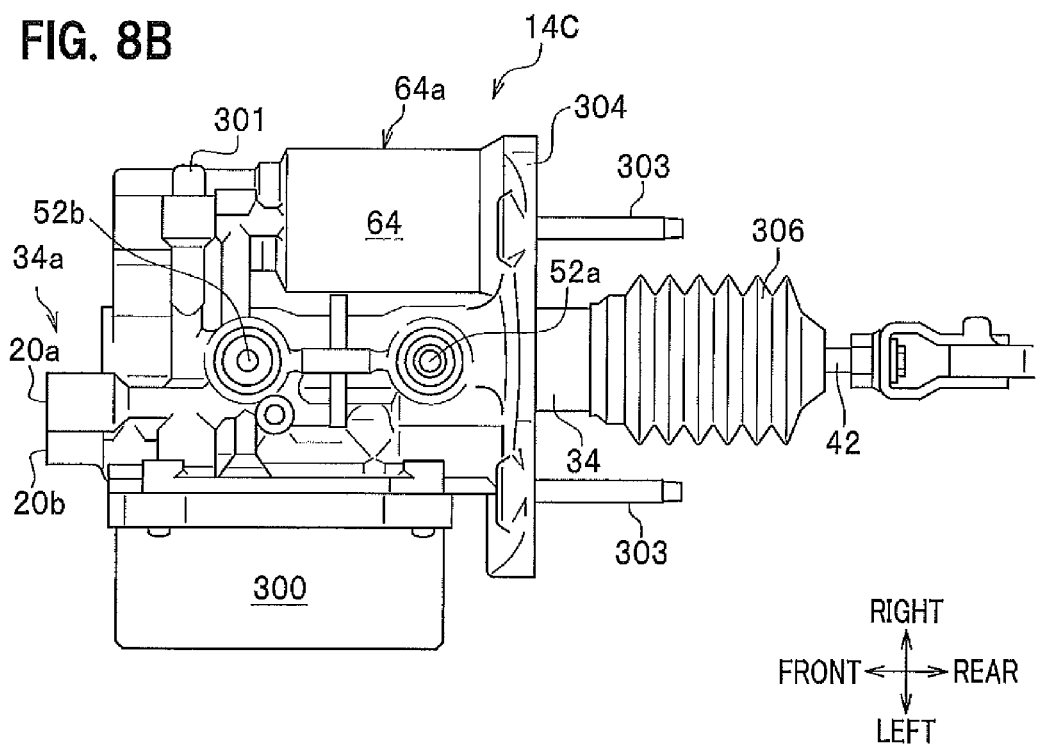
FIG. 8B is a plan view of the input device.

FIG. 8A is a schematic perspective view of the input device 14C according to the third embodiment. FIG. 8B is a plan view of the input device 14C according to the third embodiment. In FIG. 8B, the first reservoir of FIG. 8A is omitted for the purpose of simplification of drawing.

As illustrated in FIGS. 8A and 8B, the master cylinder 34 as a component of the input device 14C extends in the back-and-forth direction of the vehicle V (see FIG. 1), and the stroke simulator 64 is integrally provided side by side with the master cylinder 34. More specifically, the stroke simulator 64 of the third embodiment is disposed at the right (external side in the vehicle width direction) of the master cylinder 34 and side by side therewith. Moreover, the master cylinder 34 and the stroke simulator 64 of the third embodiment are formed as a metal cast body together with the stud plate 304 that supports respective rear ends of the master cylinder and the stroke simulator. Accordingly, a simulator housing 64a that is an exterior component of the stroke simulator 64 and a master cylinder housing 34a that is an exterior component of the master cylinder 34 are formed to be continuous.

Disposed above the master cylinder 34 and the stroke simulator 64 is the first reservoir 36 (see FIG. 8A) having an elongated external shape. The first reservoir 36 extends in the back-and-forth direction in such a way that the master cylinder 34 and the stroke simulator 64 partially overlap the first reservoir 36 in the vertical direction. The first reservoir 36 and the master cylinder 34 are in communication with the first and second pressure chambers 56a and 56b, and the back chambers 48a and 48b illustrated in FIG. 2 via the connection ports in communication with the relief ports 52a and 52b illustrated in FIG. 8B. Denoted by reference numeral 36a in FIG. 8A is a connector connected with a basal end of the piping tube 86 (see FIG. 2) which allows the first reservoir 36 to be in communication with the second reservoir 84 illustrated in FIG. 2. The connector 36a is formed of a tube member, of the input device 14C, that protrudes frontward.

Moreover, as illustrated in FIGS. 8A and 8B, provided at the front side of the master cylinder housing 34a are the first connection port 20a connected with the basal end of the first piping tube 22a extending to the joint 23a illustrated in FIG. 1, and the second connection port 20b connected with the basal end of the fourth piping tube 22d extending to the joint 23b illustrated in FIG. 1.

As illustrated in FIGS. 8A and 8B, the air bleeder 301 and the sensor unit 300 are provided at the right of the input device 14C and the left thereof, respectively.

Furthermore, as illustrated in FIGS. 8A and 8B, the rear portion of the master cylinder 34 extends rearward further from the stud plate 304 at the rear of the input device 14C. The rear portion of the master cylinder 34 is configured to receive another end of the push rod 42 having one end linked with the brake pedal 12 (see FIG. 2) as explained above. In FIGS. 8A and 8B, denoted by reference numeral 306 is a boot disposed across the master cylinder 34 and the pushrod 42.

Moreover, as explained above, the input device 14C is fastened to the dashboard 2 (see FIG. 1) through the stud bolts 303 that projects rearward from the stud plate 304, and with this configuration, a part of the master cylinder 34 extends rearward from the stud plate 304 through the dashboard 2 into a vehicle interior C (see FIG. 1).

The sensor unit 300 has in a resin-made casing thereof the first fluid pressure sensor Pm and the second fluid pressure sensor Pp illustrated in FIG. 2, an electric circuit substrate (unillustrated) for processing pressure detection signals from those sensors, and the first cut-off valve 60a, the second cut-off valve 60b, and the third cut-off valve 62 illustrated in FIG. 2 (actuations of all of which are controlled by the electric circuit substrate), etc. The first fluid pressure sensor Pm and the second fluid pressure sensor Pp are in communication with unillustrated monitor holes provided so as to be in communication with the first fluid pressure passage 58a and the second fluid pressure passage 58b, respectively, thereby detecting the above-explained respective fluid pressures. The monitor holes are formed as openings drilled to the first fluid pressure passage 58a and the second fluid pressure passage 58b from the sensor unit 300.

Figure 9A:
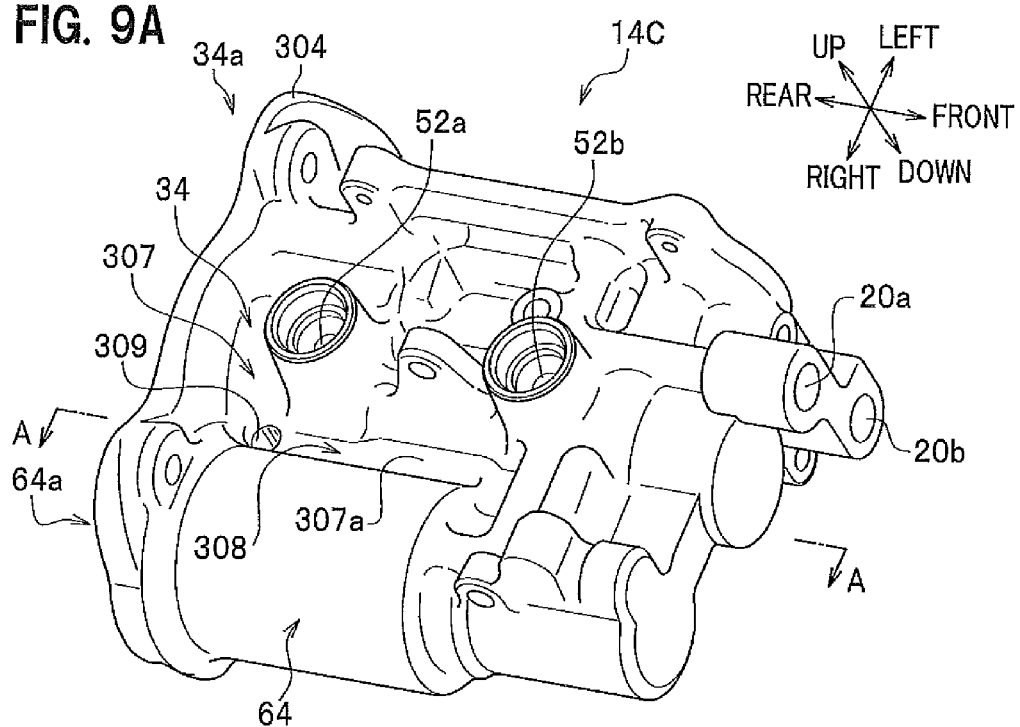
FIG. 9A is a schematic perspective view of the input device of the vehicle brake system according to the third embodiment which illustrates a recess and a through-hole.

As explained above, the master cylinder housing 34a that is an exterior component of the master cylinder 34 and the simulator housing 64a that is an exterior component of the stroke simulator 64 are formed so as to be continuous in the horizontal direction, and as illustrated in FIG. 9A, a recess 308 is formed in a coupled portion 307 between the master cylinder 34 (master cylinder housing 34a) and the stroke simulator 64 (simulator housing 64a). The recess 308 is formed by coupling the master cylinder housing 34a, which is of a cylindrical shape, with the simulator housing 64a which is likewise of a cylindrical shape, and as a result, the recess 308 forms a thinned portion recessed in each of the upward and downward directions between the master cylinder 34 and the stroke simulator 64.

Figure 9B:
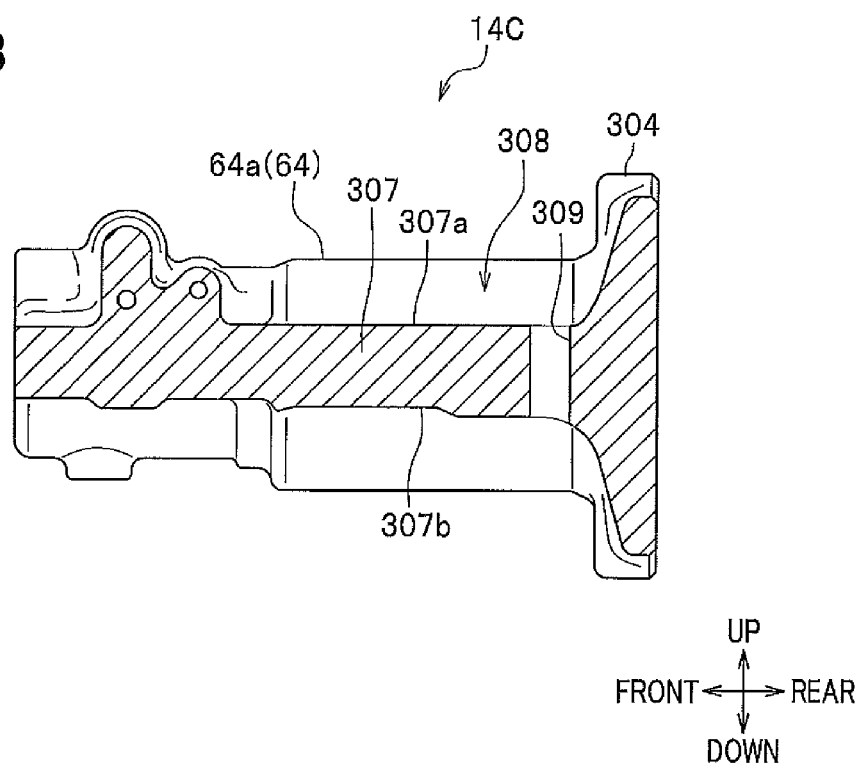
FIG. 9B is a cross-sectional view taken along a line A-A in FIG. 9A.

The recess 308 has a through-hole 309 open at a bottom face 307a (upper face of the coupled portion 307) of the recess 308 for water drainage. This through-hole 309 penetrates through the coupled portion 307 in the height direction (vertical direction) as illustrated in FIG. 9B, has an upper end open at the rear end of the bottom face 307a (upper face of the coupled portion 307) of the recess 308, and has a bottom end open at a bottom face 307b of the coupled portion 307.

Figure 10:
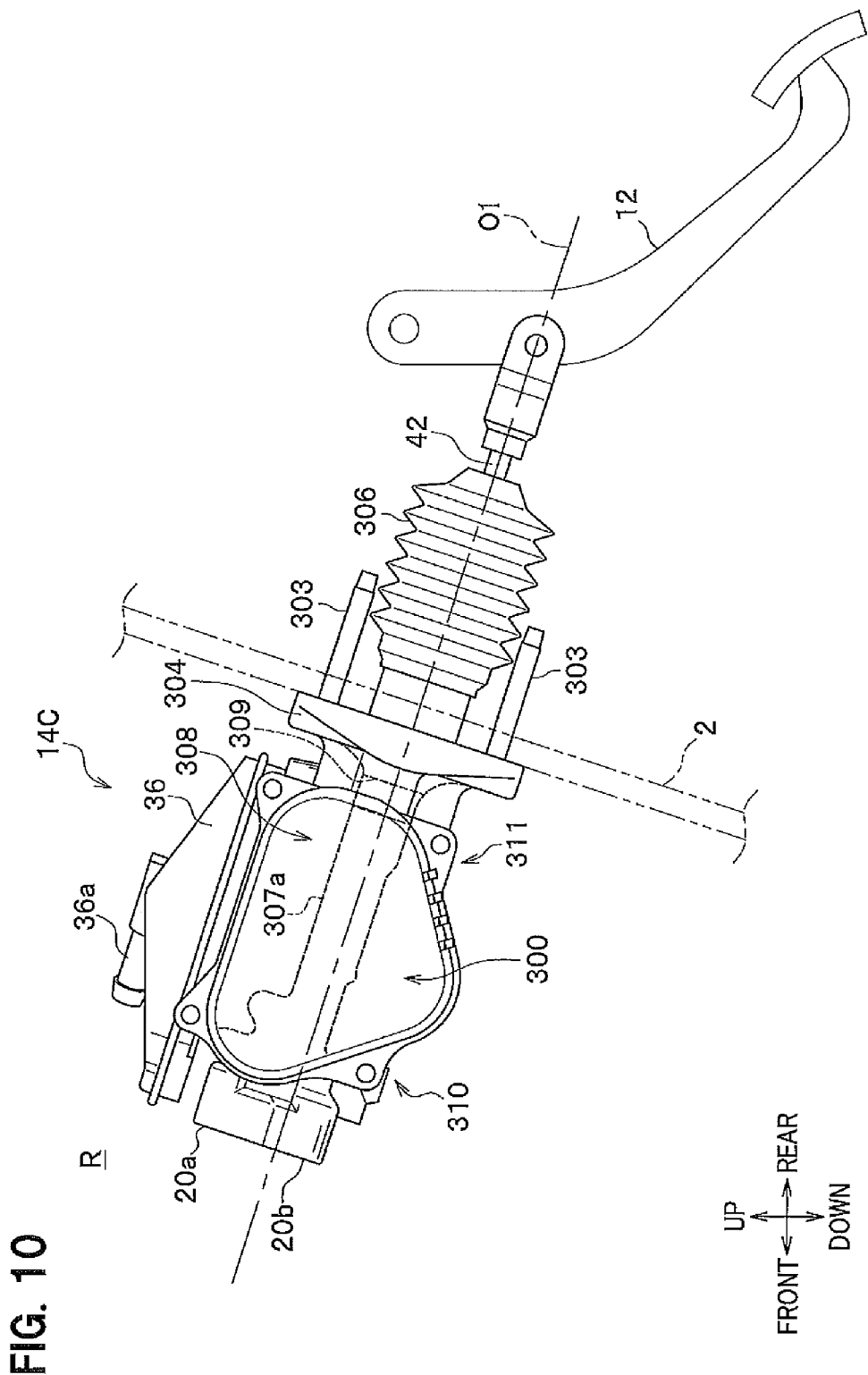
FIG. 10 is a side view illustrating a state in which the input device of the vehicle brake system according to the third embodiment is attached to a dashboard.

As illustrated in FIG. 10, such an input device 14C is fastened to the dashboard 2 via the stud bolts 303 protruding from the stud plate 304. The dashboard 2 is inclined rearward relative to the vertical plane, and the input device 14C fastened to such an inclined dashboard 2 has an axial line O1 inclined so that a front part 310 is located higher than a rear part 311. Accordingly, as indicated by dashed lines in the figure, the recess 308 of the input device 14C is inclined downwardly from the front part 310 to the rear part 311. The upper end opening of the through-hole 309 is located near the rear end of the bottom face 307a of the recess 308 inclined downwardly.

In the input device 14C fastened in this manner, when water, etc., splashes the input device 14C while, for example, the vehicle is running, water, etc., not blocked by the elongated first reservoir 36 may enter the recess 308 between the master cylinder 34 and the stroke simulator 64.

Figure 11A:
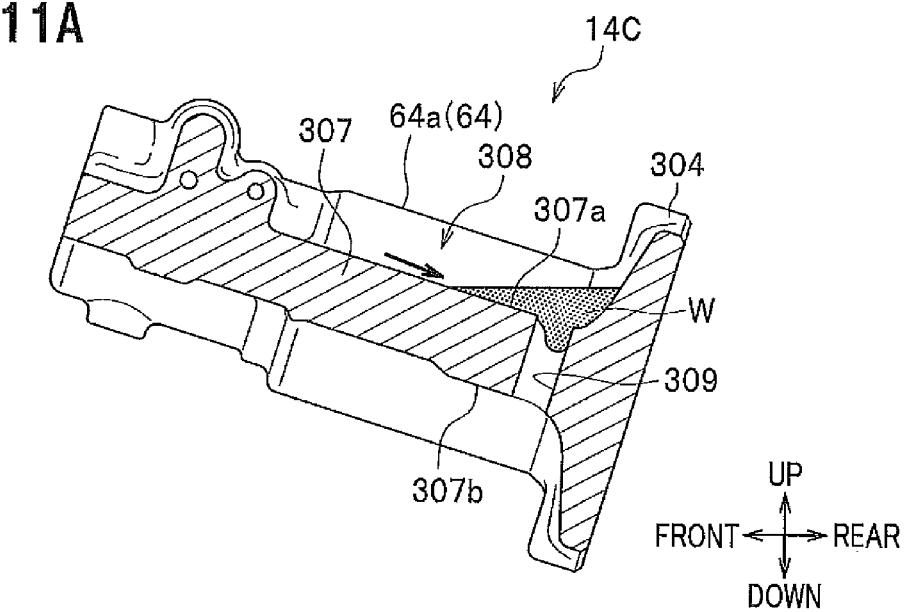
FIGS. 11A and 11B are explanatory diagrams of a function.

As explained above, the recess 308 is inclined downwardly from the front part 310 of the input device 14C to the rear part 311 thereof. Accordingly, as illustrated in FIG. 11A, water W, etc., having entered the recess 308 flows over the bottom face 307a of the recess 308 toward the rear end, and is guided to the periphery of the opening of the through-hole 309 near the rear end of the bottom face 307a.

Figure 11B:
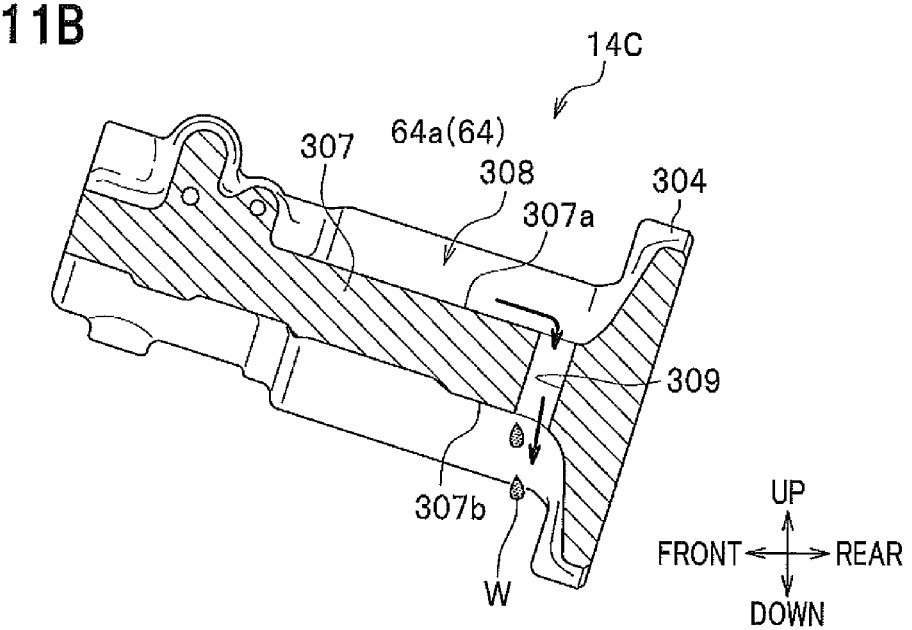

Since the bottom end of the through-hole 309 is open at the bottom face 307b of the coupled portion 307, the water W, etc., guided to the periphery of the opening of the through-hole 309 enters the through-hole 309, flows through the through-hole 309, and is drained downward from the input device 14C as illustrated in FIG. 11B.

Accordingly, the water W, etc., does not remain in the recess 308 of the coupled portion 307, and thus a water accumulation in the recess 308 is avoided appropriately.

According to the above-explained third embodiment, the input device 14C and the motor cylinder device 16 are spaced apart from each other in the engine room R, and thus the device can be downsized in comparison with a case in which those are integrated together. Hence, the degree of the freedom for the layout in the engine room R can be enhanced.

That is, in the engine room R, the input device 14C and the motor cylinder device 16 are disposed separately from each other, and thus the dimension of each device can be reduced. Accordingly, it becomes unnecessary to secure a large empty space, and each device can be mounted in a compact empty space.

Moreover, by configuring the input device 14C and the motor cylinder device 16 as separate devices from each other, the general versatility of each device is improved, making it easier for the respective devices to be applied to different kinds of vehicles.

Since the input device 14C and the motor cylinder device 16 are configured as separate devices, the motor cylinder device 16 that can be a source of noise and vibrations in some cases can be disposed so as to be apart from the driver, which prevents the driver from feeling strange (discomfort) due to noise and vibrations.

Since the input device 14C has the master cylinder 34 and the stroke simulator 64 formed integrally, the piping between those components can be minimized, and thus the input device 14C can be downsized. As a result, it becomes possible for electric vehicles and hybrid vehicles, etc., having a limited mounting space in comparison with gasoline-fueled vehicles to mount the input device 14C of the third embodiment. Accordingly, components can be made common to, for example, gasoline-fueled vehicles, electric vehicles, and hybrid vehicles, thereby reducing the manufacturing costs.

The input device 14C has the recess 308 formed between the master cylinder 34 and the stroke simulator 64 provided side by side to the master cylinder 34. The formation of the recess 308 serves to remove the excess portion between the master cylinder 34 and the stroke simulator 64, thereby accomplishing a weight saving.

Moreover, the recess 308 is formed with the through-hole 309 for water drainage. Accordingly, even if the water W, etc., is accumulated in the recess 308, the water W, etc., can be appropriately discharged through the recess 308 downward from the input device 14C through the through-hole 309. Hence, the input device 14C can be obtained which permits the water W, etc., to travel and which suppresses an accumulation of the water.

A further weight saving is accomplished by providing the through-hole 309. Moreover, it contributes to rust prevention since an accumulation of water is preventable.

According to the above-explained embodiment, the one through-hole 309 is formed in the recess 308, but the present invention is not limited to this number, and a plurality of through-holes 309 may be formed in the recess 308.

By employing such a structure, the water W, etc., accumulated in the recess 308 can be appropriately discharged through the plurality of through-holes 309. Hence, the input device 14C can be obtained which appropriately permits the water W, etc., to travel and which further suppresses an accumulation of the water.

By providing the plurality of through-holes 309, a further weight saving can be accomplished. Moreover, since an accumulation of water can be further prevented, the rust prevention effect is further enhanced.

Fourth Embodiment

Next, an explanation will be given of a configuration of the input device 14D according to a fourth embodiment with reference to FIGS. 12A to 13B.

Figure 12A:
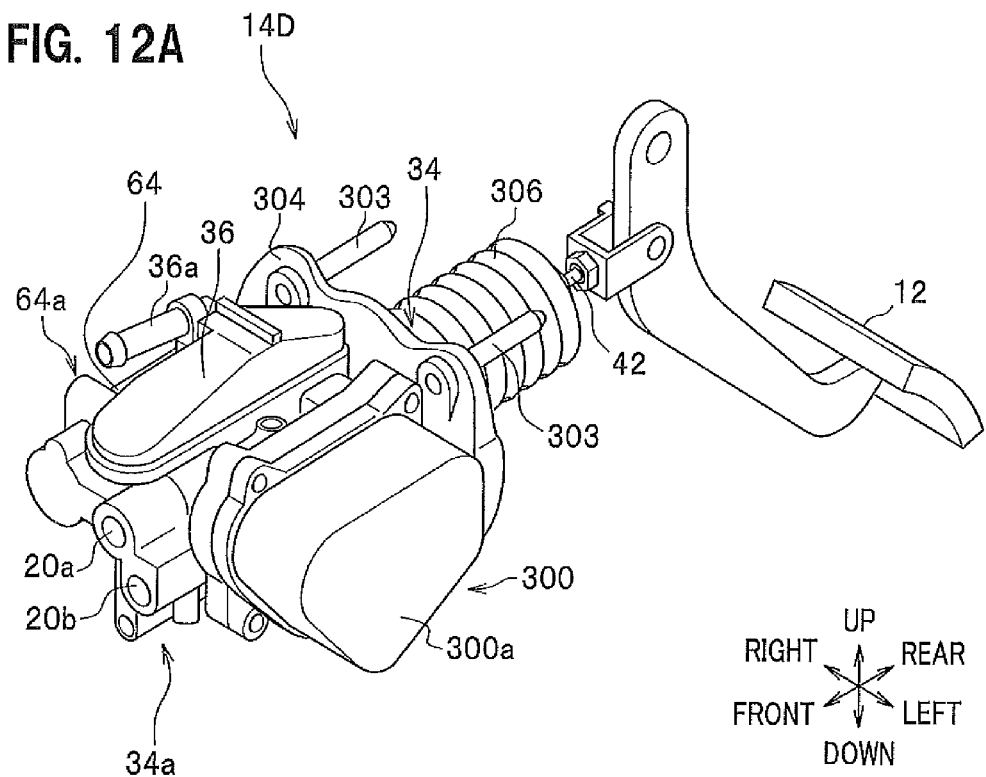
FIG. 12A is an overall perspective view of an input device according to a fourth embodiment.
Figure 12B:
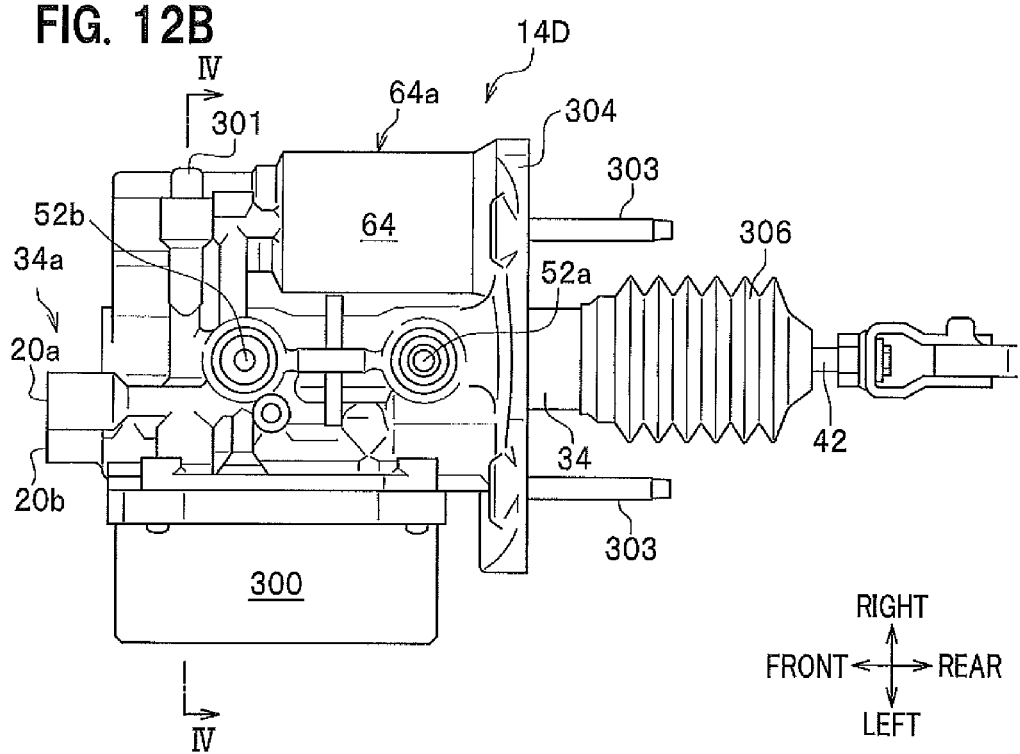
FIG. 12B is a plan view of the input device.
Figure 13A:
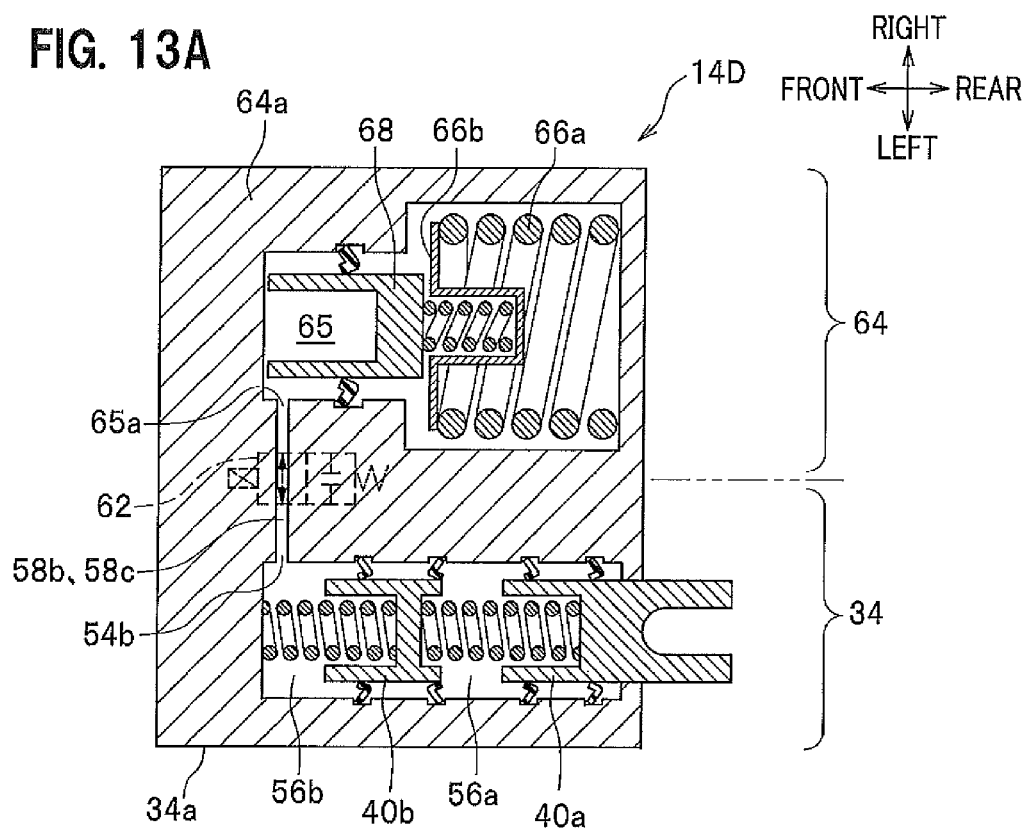
FIG. 13A is a schematic diagram illustrating a layout of a master cylinder and that of a stroke simulator constructing the input device according to the fourth embodiment.
Figure 13B:
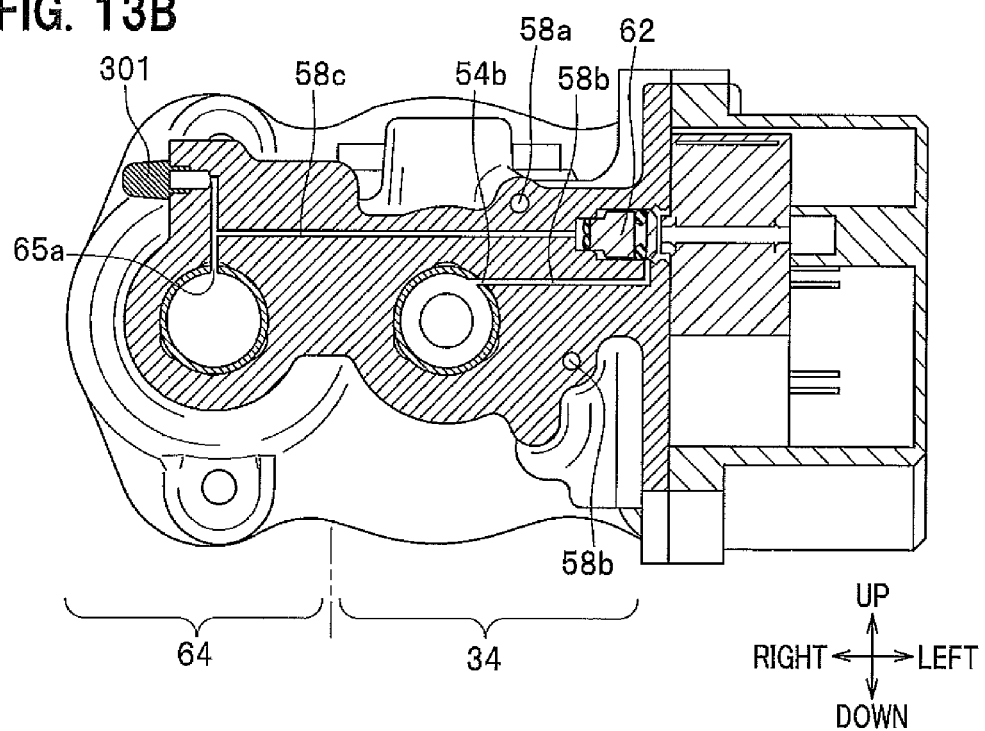
FIG. 13B is a cross-sectional view taken along a line IV-IV in FIG. 12B.

FIG. 12A to be referred is a whole perspective view of the input device according to the fourth embodiment, and FIG. 12B is a plan view of the input device. However, in FIG. 12B, the illustration of the first reservoir and the brake pedal in FIG. 12A is omitted in order to simplify the illustration. FIG. 13A is an exemplary diagram illustrating the layout of the master cylinder and the stroke simulator as components of the input device, and FIG. 13B is a cross-sectional view taken along a line IV-IV in FIG. 12B.

As illustrated in FIGS. 12A and 12B, the master cylinder 34 as a component of the input device 14D extends in the back-and-forth direction of the vehicle V (see FIG. 1), and the stroke simulator 64 is integrally provided side by side with the master cylinder 34. More specifically, the stroke simulator 64 of the fourth embodiment is disposed at the right (external side in the vehicle width direction) of the master cylinder 34 and side by side therewith. The master cylinder 34 and the stroke simulator 64 of the fourth embodiment are formed as a metal cast body together with the stud plate 304 supporting the respective rear ends of the master cylinder 34 and the stroke simulator 64, and the simulator housing 64a that is an external component of the stroke simulator 64 and the master cylinder housing 34a that is an external component of the master cylinder 34 are formed so as to be continuous with each other.

The first reservoir 36 (see FIG. 12A) having an elongated external shape is disposed above such a master cylinder 34 and a stroke simulator 64 so as to extend in the back-and-forth direction and to partially overlap the master cylinder 34 and the stroke simulator 64 in the vertical direction. The first reservoir 36 and the master cylinder 34 are in communication with the first and second pressure chambers 56a, 56b, and the back chambers 48a, 48b illustrated in FIG. 2 through connection ports in communication with the relief ports 52a, 52b illustrated in FIG. 12B and the unillustrated supply ports 46a, 46b (see FIG. 2). In FIG. 12A, denoted by reference numeral 36a is the connector connected with the basal end of the piping tube 86 which allows the first reservoir 36 to be in communication with the second reservoir 84 illustrated in FIG. 2. The connector 36a is formed of a piping member of the input device 14D protruding frontward.

Moreover, as illustrated in FIGS. 12A and 12B, provided at the front side of the master cylinder housing 34a are the first connection port 20a connected with the basal end of the first piping tube 22a extending to the joint 23a illustrated in FIG. 1, and the second connection port 20b connected with the basal end of the fourth piping tube 22d extending to the joint 23b illustrated in FIG. 1.

Furthermore, as illustrated in FIGS. 12A and 12B, the air bleeder 301 to be discussed in detail later and the sensor unit 300 are provided at the right of the input device 14D and the left thereof.

As illustrated in FIGS. 12A and 12B, the rear portion of the master cylinder 34 extends rearward further from the stud plate 304 at the rear of the input device 14D. The rear portion of the master cylinder 34 is configured to receive another end of the push rod 42 having one end linked with the brake pedal 12 (see FIG. 2) as explained above. In FIGS. 12A and 12B, denoted by reference numeral 306 is a boot disposed across the master cylinder 34 and the push rod 42.

Moreover, as explained above, the input device 14D is fastened to the dashboard 2 (see FIG. 1) by the stud bolts 303 protruding rearward from the stud plate 304, and with this configuration, a part of the master cylinder 34 extends rearward from the stud plate 304 through the dashboard 2 into the interior C (see FIG. 1) of the vehicle.

The input device 14D of the fourth embodiment is attached in such a manner that the axial direction of the master cylinder 34 is inclined upwardly toward the front of the vehicle in accordance with the inclination of the dashboard 2 at the attachment location.

Next, an internal structure of the input device 14D will be explained in further detail.

As illustrated in FIG. 13A, a port 65a in communication with the fluid pressure chamber 65 of the stroke simulator 64 is connected to the port 54b in communication with the second pressure chamber 56b of the master cylinder 34. That is, as illustrated in FIG. 2, the port 65a of the stroke simulator 64 is connected to the port 54b formed near the front end of the second pressure chamber 56b disposed ahead of the first pressure chamber 56a. The port 54b and the port 65a correspond to the "port" defined in the appended claims.

Moreover, as illustrated in FIG. 13A, the respective ports 54b and 65a of the master cylinder 34 and the stroke simulator 64 are formed to have respective positions in the back-and-forth direction substantially matching each other, i.e., formed to have respective front end positions substantially matching each other.

Those ports 54b and 65a are connected together through the second fluid pressure passage 58b (see FIG. 2) and the branched fluid pressure passage 58c (see FIG. 2) as explained above.

In FIG. 13A, denoted by reference numerals 40a and 40b are the above-explained pistons of the master cylinder 34, respectively, denoted by reference numerals 66a and 66b are the above-explained return springs of the stroke simulator 64, respectively, and denoted by reference numeral 68 is the above-explained simulator piston.

In FIG. 13A, in order to simplify the illustration, the third cut-off valve 62 is illustrated schematically with dashed lines, but the layout of the third cut-off valve 62 will be explained later in more detail.

According to the input device 14D, as illustrated in FIG. 13B, the port 54b of the master cylinder 34 and the port 65a of the stroke simulator 64 are formed at the respective upper portions of the master cylinder 34 and the stroke simulator 64.

The second fluid pressure passage 58b and the branched fluid pressure passage 58c connecting the respective ports 54b and 65a of the master cylinder 34 and the stroke simulator 64 together are formed so as to extend toward respective lateral sides of the master cylinder 34 and the stroke simulator 64. More specifically, the branched fluid pressure passage 58c of the fourth embodiment extends from the stroke simulator 64, through the upper part of the master cylinder 34 disposed at the left, further through the third cut-off valve 62 disposed near the adjoining face with the sensor unit 300 to be discussed later, to reach the adjoining face with the sensor unit 300.

Moreover, the second fluid pressure passage 58b of the fourth embodiment is bent upwardly in the halfway of extending side by side with the branched fluid pressure passage 58c from the master cylinder 34 toward the sensor unit 300 disposed at the left, is merged with the branched fluid pressure passage 58c extending between the third cut-off valve 62 and the sensor unit 300, and extends to the second connection port 20b illustrated in FIG. 12A through the second cut-off valve 60b illustrated in FIG. 2.

The second fluid pressure passage 58b and the branched fluid pressure passage 58c correspond to a "brake fluid passage connecting together the respective ports of the master cylinder and the stroke simulator" defined in the appended claims, and the third cut-off valve 62 corresponds to an "open/close valve disposed in a halfway of the brake fluid passage connecting the respective ports of the master cylinder and the stroke simulator" defined in the appended claims.

Meanwhile, as illustrated in FIG. 13B, the second fluid pressure passage 58b after passing through the second cut-off valve 60b in FIG. 2 extends in the forward direction (forward direction in FIG. 12A) along the master cylinder 34 at the lower left part thereof, to reach the second connection port 20b illustrated in FIG. 12A.

According to such an input device 14D, in addition to the second fluid pressure passage 58b and the branched fluid pressure passage 58c, disposed in the master cylinder housing 34a and the simulator housing 64a illustrated in FIG. 13A are the third cut-off valve 62 provided on the branched fluid pressure passage 58c illustrated in FIGS. 12A and 12B, the first fluid pressure passage 58a connecting the output port 54a of the master cylinder 34 with the first connection port 20a, the first cut-off valve 60a provided on the first fluid pressure passage 58a, and the second cut-off valve 60b provided on the second fluid pressure passage 58b.

Returning to FIGS. 12A and 12B, the input device 14D has in a resin-made casing thereof the sensor unit 300 located at the left of the master cylinder 34. The sensor unit 300 has the first fluid pressure sensor Pm and the second fluid pressure sensor Pp illustrated in FIG. 2, and electric circuit substrates (unillustrated) processing pressure detection signals from those sensors, and, the first cut-off valve 60a, the second cut-off valve 60b and the third cut-off valve 62 illustrated in FIG. 2 (actuations of all of which are controlled by the electric circuit substrates), etc. The first fluid pressure sensor Pm and the second pressure sensor Pp are disposed so as to be in communication with unillustrated monitor holes provided so as to be in communication with the first fluid pressure passage 58a and the second fluid pressure passage 58b, respectively, thereby detecting the respective fluid pressures. The monitor holes are formed as openings drilled to the first fluid pressure passage 58a and the second fluid pressure passage 58b from the sensor unit 300 illustrated in FIG. 13B.

As illustrated in FIG. 13B, the air bleeder 301 is a plug branched from the branched fluid pressure passage 58c connected with the port 65a of the stroke simulator 64, extending straightly upwardly from the port 65a, and disposed so as to block off the opening of the passage in communication with the exterior of the stroke simulator 64.

The bleeder 301 is to bleed the air left in the master cylinder 34, the stroke simulator 64, and the fluid pressure passage, etc., when a brake fluid is filled in the master cylinder 34 and the stroke simulator 64.

The input device 14D of the fourth embodiment and the vehicle brake system 10 including such an input device basically employ the above-explained structures, and functions and advantages thereof will be explained next.

In the normal operation condition in which the vehicle brake system 10 operates normally, the first cut-off valve 60a and the second cut-off valve 60b each of which is a normally opened solenoid valve is closed by excitation, and the third cut-off valve 62 which is a normally closed solenoid valve is opened by excitation. Hence, the first cut-off valve 60a and the second cut-off valve 60b block the first fluid pressure system 70a and the second fluid pressure system 70b, and thus no brake fluid pressure produced by the master cylinder 34 of the input device 14D is transmitted to the respective wheel cylinders 32FR, 32RL, 32RR, and 32FL of the disc brake mechanisms 30a to 30d.

At this time, the brake fluid pressure produced by the second pressure chamber 56b of the master cylinder 34 is transmitted to the fluid pressure chamber 65 of the stroke simulator 64 through the branched fluid pressure passage 58c and the third cut-off valve 62 that is held opened. The brake fluid pressure supplied to the fluid pressure chamber 65 causes the simulator piston 68 to be displaced against the spring forces of the return springs 66a and 66b. Accordingly, the stroke operation of the brake pedal 12 is permitted and pseudo pedal reaction force is generated and is applied to the brake pedal 12. As a result, the driver can obtain a brake feeling that he/she is accustomed to.

When the system is in the above-described state, when detecting the depression of the brake pedal 12 by the driver, the unillustrated control means actuates the electric motor 72 of the motor cylinder device 16 to depress the actuator mechanism 74, and thus the first slave piston 88a and the second slave piston 88b are displaced toward the direction of an arrow X1 in FIG. 2 against the spring forces of the first return spring 96a and the second return spring 96b. The respective displacements of the first slave piston 88a and the second slave piston 88b pressurize the brake fluid in the first fluid pressure chamber 98a and the second fluid pressure chamber 98b in a balanced manner, and thus a desired brake fluid pressure is produced.

The brake fluid pressure of the first fluid pressure chamber 98a in the motor cylinder device 16 and of the second fluid pressure chamber 98b therein is transmitted to the respective wheel cylinders 32FR, 32RL, 32RR, and 32FL of the disc brake mechanisms 30a to 30d through the first and second in-valves 120 and 124 of the VSA device 18 that are held opened, and the respective wheel cylinders 32FR, 32RL, 32RR, and 32FL are actuated, thereby applying desired braking force to the respective wheels.

In other words, according to the vehicle brake system 10 of the fourth embodiment, in the normal operation condition in which the motor cylinder device 16 serving as the power source for generating a fluid pressure and the unillustrated ECU, etc., performing by-wire control are operable, a so-called brake-by-wire brake system is activated which causes the disc brake mechanisms 30a to 30d to be actuated by the brake fluid pressure produced by the motor cylinder device 16 with a communication between the master cylinder 34 that produces a brake fluid pressure when the driver depresses the brake pedal 12 and the disc brake mechanisms 30a to 30d (wheel cylinders 32FR, 32RL, 32RR, and 32FL) that control the respective wheels being cut off by the first cut-off valve 60a and the second cut-off valve 60b. Hence, according to the fourth embodiment, the present invention can be suitably applied to the vehicle V such as an electric vehicle which has no negative pressure produced by an internal combustion engine conventionally used.

Conversely, in the abnormal operation condition in which the motor cylinder device 16, etc., becomes inoperable, a so-called conventional hydraulic brake system is activated which causes the first cut-off valve 60a and the second cut-off valve 60b to be opened, respectively, and the third cut-off valve 62 to be closed, and which transmits the brake fluid pressure produced by the master cylinder 34 to the disc brake mechanisms 30a to 30d (wheel cylinders 32FR, 32RL, 32RR, and 32FL), thereby actuating the disc brake mechanisms 30a to 30d (wheel cylinders 32FR, 32RL, 32RR, and 32FL).

As explained above, according to the vehicle brake system 10, the input device 14D and the motor cylinder device (electric brake actuator) 16, and the VSA device (vehicle behavior stabilizing device) 18 are disposed separately from each other in the engine room (mounting space of a power unit) R, the input device 14D, the motor cylinder device 16, and the VSA device 18 can have reduced sizes, respectively, and thus the degree of freedom for the layout can be enhanced.

Meanwhile, in addition to a power unit 3, devices, such as an electric system, a suction system, an exhaust system, and cooling system, are mounted in the engine room R, and it becomes inevitably difficult to ensure a large empty space (installation space). Hence, when the input device 14D, the motor cylinder device 16, and the VSA device 18 are separately disposed as in the fourth embodiment, the respective sizes of the devices (input device 14D, motor cylinder device 16, and VSA device 18) can be reduced, and it becomes unnecessary to ensure a large empty space. Accordingly, the respective devices can be mounted even if the empty space in the engine room R is narrow, and the layout of those devices is facilitated.

According to the vehicle brake system 10, the input device 14D, the motor cylinder device 16, and the VSA device 18 are configured as separate devices, and thus the general versatility of each device (input device 14D, motor cylinder device 16, and VSA device 18) is enhanced, and application of each device to different kinds of vehicles is facilitated.

Moreover, according to the vehicle brake system 10, the motor cylinder device 16 is disposed so as to be apart from the input device 14D fastened to the dashboard 2. Accordingly, the motor cylinder device 16 which is a source of noise and vibrations in some cases can be disposed so as to be apart from the driver, which prevents the driver from feeling strange (discomfort) due to noise and vibrations.

Furthermore, according to the vehicle brake system 10, it is unusual that an empty space is formed in the engine room R in a manner unsymmetrical to the right or to the left in the vehicle width direction. Hence, when the motor cylinder device 16 and the VSA device 18 are disposed at the opposite sides to each other in the vehicle width direction, the empty space for installing those motor cylinder device 16 and VSA device 18 can be easily ensured, and thus the layout of those devices is facilitated.

Next, functions of the input device 14D as a component of the vehicle brake system 10 and advantages thereof will be explained.

According to the input device 14D, as illustrated in FIGS. 13A and 13B, the stroke simulator 64 is provided integrally with and side by side with the master cylinder 34 extending in the back-and-forth direction of the vehicle V (see FIG. 1), and the respective front end positions of the port 54b of the master cylinder 34 and the port 65a of the stroke simulator 64 are substantially consistent with each other. Hence, the input device 14D can be realized which is reduced in width and length and thus downsized.

According to such an input device 14D, the second fluid pressure passage 58b and the branched fluid pressure passage 58c connecting the respective ports 54b and 65a of the master cylinder 34 and the stroke simulator 64 are formed to extend from the master cylinder 34 and the stroke simulator 64, respectively, toward the respective lateral sides, and thus the second fluid pressure passage 58b and the branched fluid pressure passage 58c can be designed to be short. Hence, according to this input device 14D, a further downsizing can be realized.

According to such an input device 14D, the respective ports 54b and 65a of the master cylinder 34 and the stroke simulator 64 are formed in the respective upper portions of the master cylinder 34 and the stroke simulator 64. Hence, according to this input device 14D, when the brake fluid is filled in the master cylinder 34 and the stroke simulator 64 and the air in the master cylinder 34 and the stroke simulator 64 are bled, the air bleeding through the bleeder 301 (see FIG. 13B) is facilitated.

According to the input device 14D of the fourth embodiment, as explained above, the input device is attached to the dashboard 2 in such a manner that the axis of the master cylinder 34 is inclined upwardly toward the front of the vehicle V. Accordingly, the bleeder 301 is located at the leading end of the input device 14D and thus at the highest position in inclination. As a result, the air bleeding through the bleeder 301 is further facilitated.

According to such an input device 14D, the third cut-off valve 62 disposed in the halfway of the second fluid pressure passage 58b connecting the respective ports 54b and 65a of the master cylinder 34 and the stroke simulator 64 together is built in. Hence, according to this input device 14D, a vehicle brake system 10 simplified in comparison with, for example, one having the third cut-off valve 62 disposed outside the input device 14D can be constructed.

According to such an input device 14D, as illustrated in FIG. 12A, the connector 36a, the first connection port 20a, and the second connection port 20b are formed at the front side of the input device. Accordingly, attaching works of the piping tube 86 (see FIG. 2), the first piping tube 22a (see FIG. 2), and the fourth piping tube 22d (see FIG. 2) to the connector 36a, the first connection port 20a, and the second connection port 20b of the input device 14D fastened to the dashboard 2 (see FIG. 1) are facilitated.

Fifth Embodiment

Next, with reference to FIGS. 14A to 16, a structure of the input device 14E according to a fifth embodiment will be explained.

Figure 14A:
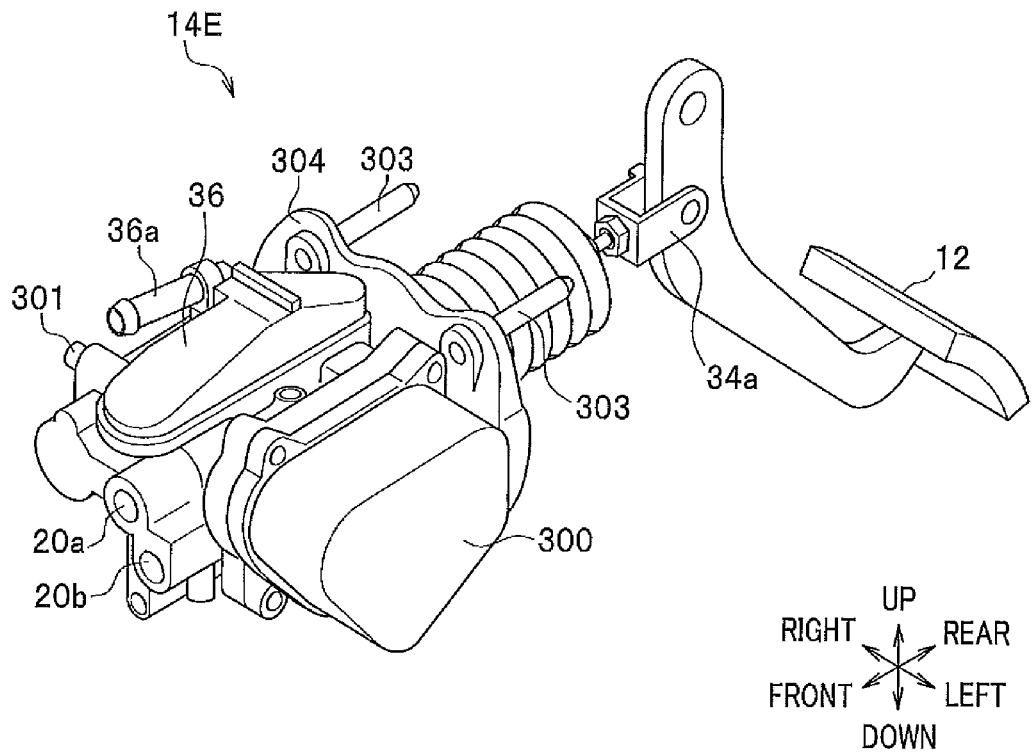
FIGS. 14A and 14B are schematic enlarged views of an input device of a vehicle brake system according to a fifth embodiment.
Figure 14B:
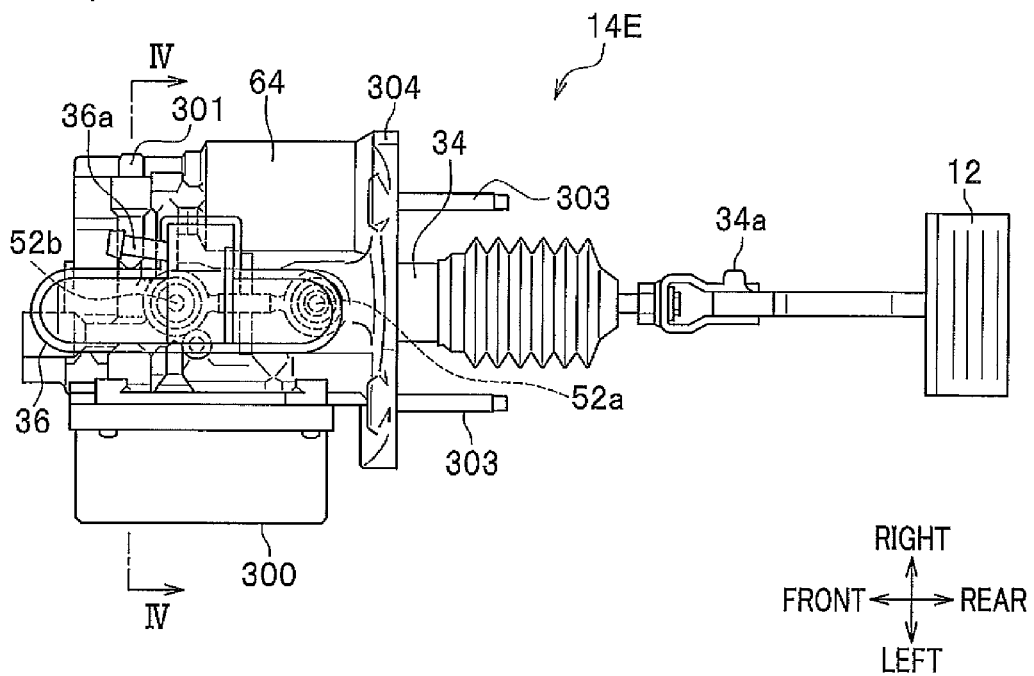

FIG. 14A is a schematic perspective view of the input device 14E, and FIG. 14B is a plan view from the top. The same component as one illustrated in FIG. 2 will be denoted by the same reference numeral in FIGS. 14A and 14B, and the detailed explanation will be omitted.

As illustrated in FIGS. 14A and 14B, the master cylinder 34 as a component of the input device 14E extends in the back-and-forth direction of the vehicle V (see FIG. 1), and the stroke simulator 64 is provided side by side with the master cylinder 34 so as to be integral therewith. More specifically, the stroke simulator 64 of the fifth embodiment is disposed side by side at the right of the master cylinder 34 (external side in the vehicle width direction). The master cylinder 34 and the stroke simulator 64 of the fifth embodiment are formed as a metal cast body together with the stud plate 304 that supports the respective rear ends of the master cylinder and the stroke simulator.

Disposed above the master cylinder 34 and the stroke simulator 64 is the first reservoir 36 (reservoir tank) having an elongated external shape so as to extend in the vehicle back-and-forth direction between the master cylinder 34 and the stroke simulator 64. At this time, the first reservoir 36 is disposed so as to partially overlap the master cylinder 34 and the stroke simulator 64 in the vertical direction. The first reservoir 36 and the master cylinder 34 are in communication with the first and second pressure chambers 56a, 56b, and the back chambers 48a, 48b, illustrated in FIG. 2 through connection ports formed in communication with the relief ports 52a, 52b illustrated in FIG. 14B and the unillustrated supply ports 46a, 46b (see FIG. 2). In FIG. 14A, denoted by reference numeral 36a is the connector connected with the basal end of the piping tube 86 that allows the first reservoir 36 to be in communication with the second reservoir 84 illustrated in FIG. 2. This connector 36a is formed of a piping member protruding forward space of the input device 14E.

The connection port 36a and the second reservoir 84 (see FIG. 2) may be directly connected together via the piping tube 86, but in accordance with the mounting layout of the vehicle, a separate tank may be provided between the connection port 36a and the second reservoir 84. When a separate tank is provided, the connection port 36a is connected with this separate tank.

As illustrated in FIGS. 14A and 14B, at the vehicle front side, the input device 14E has the first connection port 20a in communication with the master cylinder 34 and connected with the basal end of the first piping tube 22a, and the second connection port 20b in communication with the master cylinder 34 and connected with the basal end of the fourth piping tube 22d.

Moreover, as illustrated in FIGS. 14A and 14B, the air bleeder 301 and the valve unit 300 to be discussed later in detail are provided at the right and the left of the input device 14E, respectively, in a manner integral therewith.

Furthermore, as illustrated in FIGS. 14A and 14B, at the rear side of the input device 14E, the rear end of the master cylinder 34 is connected with the brake operating member 12 via a linkage 34a.

Next, a further detailed explanation will be given of an internal structure of the input device 14E.

Figure 15A:
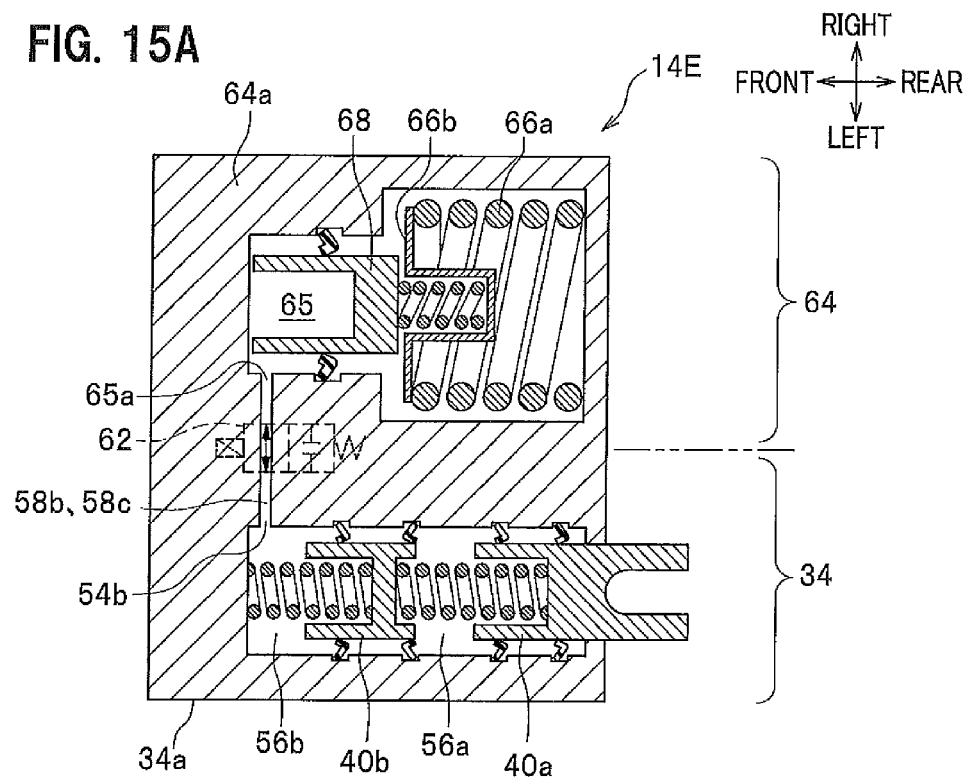
FIG. 15A is a schematic view illustrating a layout of a master cylinder and that of a stroke simulator constructing the input device of the vehicle brake system according to the fifth embodiment.

As illustrated in FIG. 15A, the port 65a in communication with the fluid pressure chamber 65 of the stroke simulator 64 is connected to the port 54b in communication with the second pressure chamber 56b of the master cylinder 34. That is, as illustrated in FIG. 2, the port 65a of the stroke simulator 64 is connected to the port 54b formed near the front end of the second pressure chamber 56b disposed ahead of the first pressure chamber 56a.

Moreover, as illustrated in FIG. 15A, in the input device 14E, the respective ports 54b and 65a of the master cylinder 34 and the stroke simulator 64 are formed so as to have respective positions in the back-and-forth direction substantially matching each other, i.e., formed so as to have respective front end positions substantially matching each other.

Those ports 54b and 65a are connected together through the second fluid pressure passage 58b (see FIG. 2) and the branched fluid pressure passage 58c (see FIG. 2) as explained above. The third cut-off valve 62 is provided between the port 54b and the port 65a. The third cut-off valve 62 illustrated in FIG. 15A is in an open condition.

In FIG. 15A, denoted by reference numerals 40a and 40b are the above-explained pistons of the master cylinder 34, respectively, denoted by reference numerals 66a and 66b are the above-explained return springs of the stroke simulator 64, and denoted by reference numeral 68 is the above-explained simulator piston.

Figure 15B:
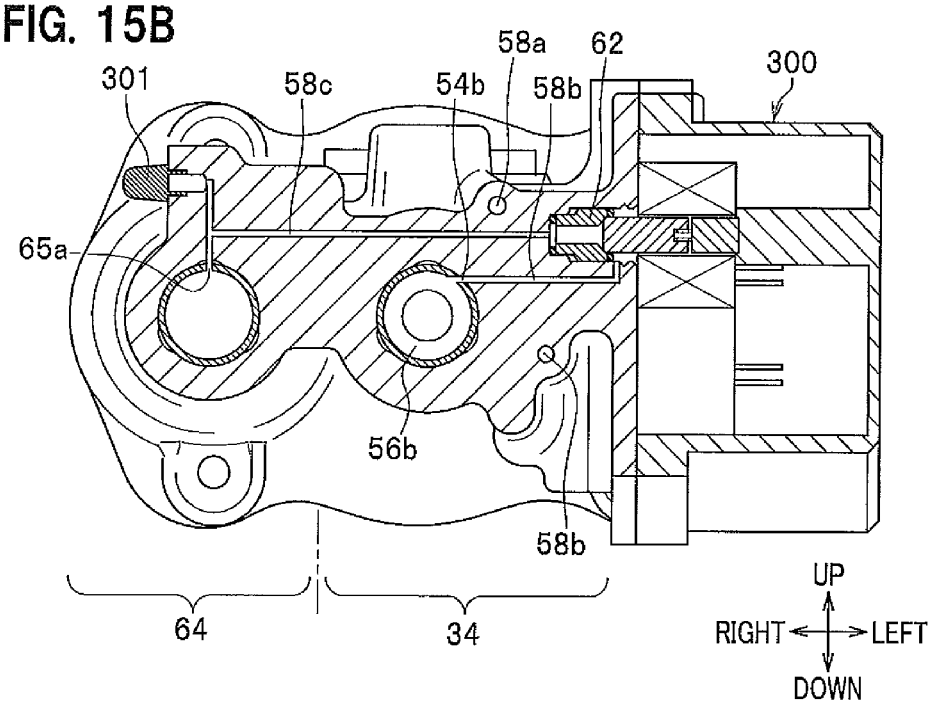
FIG. 15B is a cross-sectional view taken along a line IV-IV in FIG. 14B.

According to the input device 14E, as illustrated in FIG. 15B, the port 54b of the master cylinder 34 and the port 65a of the stroke simulator 64 are formed at the respective upper portions of the master cylinder 34 and the stroke simulator 64.

The second fluid pressure passage 58b and the branched fluid pressure passage 58c connecting the respective ports 54b and 65a of the master cylinder 34 and the stroke simulator 64 together are formed so as to extend toward the respective lateral sides of the master cylinder 34 and the stroke simulator 64. More specifically, the branched fluid pressure passage 58c of the fifth embodiment extends from the stroke simulator 64 through the upper space of the master cylinder 34 disposed at the left, further through the third cut-off valve 62 (stroke simulator cut-off valve) of the valve unit 300 to be discussed later, to reach the adjoining face with the valve unit 300. The third cut-off valve 62 is a normally closed solenoid valve as explained above, and is provided so as to block off the fluid pressure passage 58c.

The second fluid pressure passage 58b of the fifth embodiment is connected to the second pressure chamber 56b of the master cylinder 34, is bent upwardly in the halfway of extending side by side with the branched fluid pressure passage 58c toward the valve unit 300 disposed at the left of the master cylinder 34, is merged with the branched fluid pressure passage 58c extending an interval between the third cut-off valve 62 and the valve unit 300, and extends to the second connection port 20b illustrated in FIG. 14A through the second cut-off valve 60b illustrated in FIG. 2.

More specifically, the second fluid pressure passage 58b after passing through the second cut-off valve 60b illustrated in FIG. 2 extends in the forward direction (forward direction in FIG. 14A) along the master cylinder 34 at the lower left part to the master cylinder 34 as illustrated in FIG. 15B, to reach the second connection port 20b illustrated in FIG. 14A.

In addition to the second fluid pressure passage 58b and the branched fluid pressure passage 58c, disposed in the input device 14E are the third cut-off valve 62 provided on the branched fluid pressure passage 58c illustrated in FIG. 2, the first fluid pressure passage 58a connecting the output port 54a of the master cylinder 34 with the first connection port 20a, the first cut-off valve 60a (master cylinder cut-off valve) provided on the first fluid pressure passage 58a, and the second cut-off valve 60b (master cylinder cut-off valve) provided on the second fluid pressure passage 58b.

As illustrated in FIG. 15B, the air bleeder 301 is a plug branched from the branched fluid pressure passage 58c connected with the port 65a of the stroke simulator 64, extending straightly upwardly from the port 65a, and disposed so as to block off the opening of the passage in communication with the exterior of the stroke simulator 64.

The bleeder 301 is to bleed the air left in the master cylinder 34 and the stroke simulator 64, and the fluid pressure passage, etc., when a brake fluid is filled in the master cylinder 34 and the stroke simulator 64. The air bleeder 301 may be provided at a portion where the air in the master cylinder 34 and the stroke simulator 64, etc., gathers or a portion where the air is collected due to the configurations of the fluid pressure passages, such as the upper front of the master cylinder 34 or the lower front thereof.

The input device 14E of the fifth embodiment and the vehicle brake system 10 including such an input device basically employ the above-explained structures, and functions and advantages thereof will be explained next.

In the normal operation condition in which the vehicle brake system 10 operates normally, the first cut-off valve 60a and the second cut-off valve 60b each of which are a normally opened solenoid valve are closed by excitation, and the third cut-off valve 62 which is a normally closed solenoid valve is opened by excitation. Hence, the first cut-off valve 60a and the second cut-off valve 60b block the first fluid pressure system 70a and the second fluid pressure system 70b, and thus no brake fluid pressure produced by the master cylinder 34 of the input device 14E is transmitted to the respective wheel cylinders 32FR, 32RL, 32RR, and 32FL of the disc brake mechanisms 30a to 30d.

At this time, the brake fluid pressure produced by the second pressure chamber 56b of the master cylinder 34 is transmitted to the fluid pressure chamber 65 of the stroke simulator 64 through the branched fluid pressure passage 58c and the third cut-off valve 62 that is held opened. The brake fluid pressure supplied to the fluid pressure chamber 65 causes the simulator piston 68 to be displaced against the spring forces of the return springs 66a and 66b. Accordingly, the stroke operation of the brake pedal 12 is permitted and pseudo pedal reaction force is generated and is applied to the brake pedal 12. As a result, the driver can obtain a brake feeling that he/she is accustomed to.

When the system is in the above-described state, when detecting the depression of the brake pedal 12 by the driver, the unillustrated control means actuates the electric motor 72 of the motor cylinder device 16 to depress the actuator mechanism 74, and the first slave piston 88a and the second slave piston 88b are displaced toward the direction of an arrow X1 in FIG. 2 against the spring forces of the first return spring 96a and the second return spring 96b. The respective displacements of the first slave piston 88a and the second slave piston 88b pressurize the brake fluid in the first fluid pressure chamber 98a and the second fluid pressure chamber 98b, and thus a desired brake fluid pressure is produced.

The brake fluid pressure of the first fluid pressure chamber 98a in the motor cylinder device 16 and of the second fluid pressure chamber 98b therein is transmitted to the respective wheel cylinders 32FR, 32RL, 32RR, and 32FL of the disc brake mechanisms 30a to 30d through the first and second in-valves 120 and 124 of the VSA device 18 that are held opened, and the respective wheel cylinders 32FR, 32RL, 32RR, and 32FL are actuated, thereby applying desired braking force to the respective wheels.

In other words, according to the vehicle brake system 10 of the fifth embodiment, in the normal operation condition in which the motor cylinder device 16 serving as the power source for generating a fluid pressure and the unillustrated ECU, etc., performing by-wire control are operable, a so-called brake-by-wire brake system is activated which causes the disc brake mechanisms 30a to 30d to be actuated by the brake fluid pressure produced by the motor cylinder device 16 with a communication between the master cylinder 34 that produces a brake fluid pressure when the driver depresses the brake pedal 12 and the disc brake mechanisms 30a to 30d (wheel cylinders 32FR, 32RL, 32RR, and 32FL) that control the respective wheels being cut off by the first cut-off valve 60a and the second cut-off valve 60b. Hence, according to the fifth embodiment, the present invention can be suitably applied to the vehicle V such as an electric vehicle which has no vacuum booster, etc., conventionally used.

Conversely, in the abnormal operation condition in which the motor cylinder device 16, etc., becomes inoperable, a so-called conventional hydraulic brake system is activated which causes the first cut-off valve 60a and the second cut-off valve 60b to be opened, respectively, and which transmits the brake fluid pressure produced by the master cylinder 34 to the disc brake mechanisms 30a to 30d (wheel cylinders 32FR, 32RL, 32RR, and 32FL), thereby actuating the disc brake mechanisms 30a to 30d (wheel cylinders 32FR, 32RL, 32RR, and 32FL).

In the input device 14E, the valve unit 300, the master cylinder 34, and the stroke simulator 64 are provided side by side in this order from the left of the vehicle to the right thereof. Moreover, the first reservoir 36 is connected with the master cylinder 34 through connection ports in communication with the relief ports 52a, 52b (see figure) provided in the master cylinder 34.

Moreover, as illustrated in FIG. 15A, according to the fifth embodiment, the master cylinder 34 and the stroke simulator 64 are provided in such a way that the location of the port of the master cylinder and the location of the port of the stroke simulator substantially match each other in the back-and-forth direction. By disposing the master cylinder 34 and the stroke simulator 64 in this manner, the fluid passage provided therebetween can be shortened, and thus the input device 14E can be further downsized. Moreover, this enables a further quick brake actuation.

Figure 16:
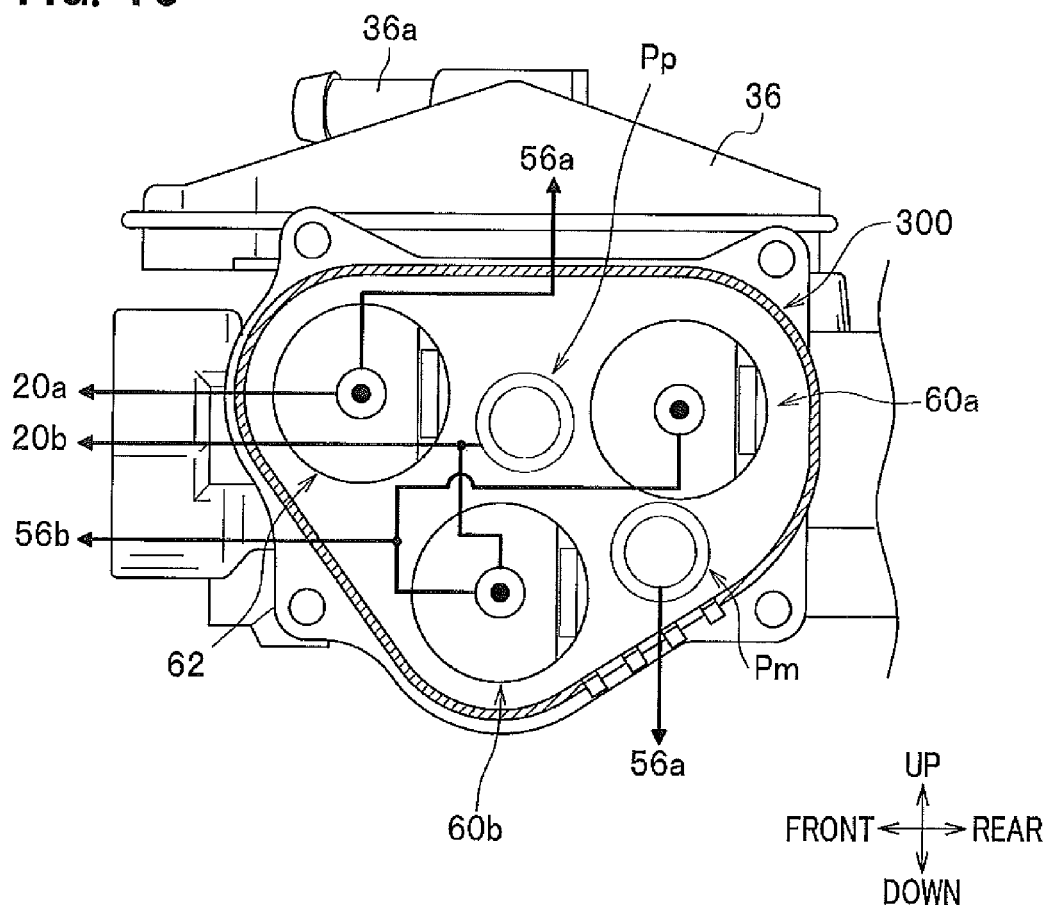
FIG. 16 is a schematic cross-sectional view of a valve unit in a vehicle back-and-forth direction.

Next, an explanation will be given of the valve unit 300 with reference to FIG. 16. FIG. 16 is a schematic diagram illustrating a cross section of the valve unit 300 in the vehicle back-and-forth direction.

As illustrated in FIG. 16, the valve unit 300 has the first fluid pressure sensor Pm and the second fluid pressure sensor Pp illustrated in FIG. 2, and, electric circuit substrates (unillustrated), etc., for processing pressure detection signals from those sensors disposed in the resin-made casing. The first fluid pressure sensor Pm and the second fluid pressure sensor Pp are disposed so as to be in communication with unillustrated monitor holes provided so as to be in communication with the first fluid pressure passage 58a and the second fluid pressure passage 58b, respectively, thereby detecting the above-explained respective fluid pressures. The monitor holes are formed as holes pierced from the valve unit 300 to the first fluid pressure passage 58a and the second fluid pressure passage 58b.

Moreover, the valve unit 300 has the first cut-off valve 60a (master cylinder cut-off valve), the second cut-off valve 60b (master cylinder cut-off valve), and the third cut-off valve 62 (stroke simulator cut-off valve) provided inside the valve unit 300. As explained above, the first cut-off valve 60a and the second cut-off valve 60b are each a normally opened solenoid valve, and are provided in the halfway of the respective fluid pressure passages 58a and 58b as illustrated in FIG. 2. Furthermore, the third cut-off valve 62 is a normally closed solenoid valve as explained above, and is provided so as to block off the fluid pressure passage 58c.

A connection relationship between the first cut-off valve 60a, the second cut-off valve 60b, and the third cut-off valve 62, and, the first fluid pressure sensor Pm and the second fluid pressure sensor Pp will be schematically illustrated in FIG. 16 by thick continuous lines.

As illustrated in FIG. 16, the first connection port 20a and the first pressure chamber 56a are connected together via the first cut-off valve 60a. Moreover, the first fluid pressure sensor Pm is provided between the first pressure chamber 56a and the first cut-off valve 60a, and it is not illustrated in FIG. 16 but the fluid pressure passage extending from the first cut-off valve 60a and the fluid pressure passage extending from the first fluid pressure sensor Pm are merged together, and connected to the first pressure chamber 56a.

Conversely, the second connection port 20b is connected to the second pressure chamber 56b via the second cut-off valve 60b. Moreover, the second fluid pressure sensor Pp is provided between the second connection port 20b and the second cut-off valve 60b. The fluid pressure passage is branched between the second cut-off valve 60b and the second pressure chamber 56b, and is connected to the stroke simulator 64 that is not illustrated in FIG. 16 via the third cut-off valve 62.

As explained above, in the input device 14E, the stroke simulator 64, the master cylinder 34, and the valve unit 300 are provided side by side in this order in the vehicle width direction in a manner integral with each other. The input device 14E employing such a structure enables the fluid passage between at least the master cylinder 34 and the stroke simulator 64 to be shortened, and thus the input device 14E can be downsized. As a result, it becomes possible for electric vehicles, hybrid vehicles, etc., which have a limited mounting space in the device mounting space in comparison with gasoline-fueled vehicles to mount the input device 14E of the fifth embodiment.

(Others)

The embodiments were explained together with specific examples, but the present invention can be carried out in a changed and modified manner as needed without departing from the scope of the present invention.

For example, according to the first embodiment, the master cylinder 34 and the stroke simulator 64 are provided side by side so as to be parallel to each other, but it is unnecessary to provide those in a parallel manner as long as those are integrated together. Moreover, it is unnecessary that those are provided in the same plane.

For example, according to the first embodiment, the master cylinder 34 and the stroke simulator 64 are formed integrally with the attachment plate 304, but it is unnecessary that those are formed integrally with the attachment plate 304 as long as the master cylinder 34 and the stroke simulator 64 are formed integrally.

Moreover, the attachment plate 304 may be provided with a thinned portion formed by thinning the attachment plate 305. By providing such a thinned portion, the vehicle can accomplish weight saving.

The specific structure of the master cylinder 34, the stroke simulator 64, or the motor cylinder device 16, etc., is not limited to any particular one, and can be set arbitrarily as long as the advantage of the present invention is not significantly reduced. It is needless to say that other structures can be changed and modified arbitrary as long as the advantage of the present invention is not significantly reduced.

For example, according to the second embodiment, the master cylinder 34 and the stroke simulator 64 are provided side by side so as to be parallel to each other, but it is unnecessary to provide those in a parallel manner as long as those are integrated together. Moreover, it is unnecessary that those are provided in the same plane.

The specific structure of the master cylinder 34, the stroke simulator 64, or the motor cylinder device 16, etc., is not limited to any particular one, and can be set arbitrarily as long as the advantage of the present invention is not significantly reduced. It is needless to say that other structures can be changed and modified arbitrarily as long as the advantage of the present invention is not significantly reduced.

Moreover, according to the fourth embodiment, the master cylinder 34 and the stroke simulator 64 are provided side by side transversely, but may be provided side by side vertically or obliquely.

According to the fourth embodiment, a structure in which the master cylinder 34 and the stroke simulator 64 are disposed in a manner parallel to each other was expected, but the master cylinder 34 and the stroke simulator 64 may be provided in parallel with a shifting in the axial direction within an acceptable range.

It is needless to say that the present invention is applicable to both right-hand-drive vehicles and left-hand-drive vehicles.

According to the fifth embodiment, the master cylinder 34 and the stroke simulator 64 are provided side by side so as to be parallel to each other, but it is unnecessary to provide those in parallel as long as those are integrated together. Moreover, it is unnecessary that those are provided in the same plane.

Moreover, according to the fifth embodiment, a structure is employed in which the first reservoir 36 (reservoir tank) partially overlaps the master cylinder 34 and the stroke simulator 64 and is located above the master cylinder 34 and the stroke simulator 64, but the location of the first reservoir 36 is not limited to this location, and for example, the first reservoir may be provided between the master cylinder 34 and the valve unit 300.

Furthermore, the respective locations of the cut-off valves and fluid pressure sensors are not limited to the ones illustrated in FIG. 16, and those components can be disposed appropriately in accordance with the respective locations of the fluid pressure passages in the valve unit 300.

The specific structure of the master cylinder 34, the stroke simulator 64, or the motor cylinder device 16, etc., is not limited to any particular one, and can be set arbitrarily as long as the advantage of the present invention is not significantly reduced. It is needless to say that other structures can be changed and modified arbitrary as long as the advantage of the present invention is not significantly reduced.

DESCRIPTION OF REFERENCE NUMERALS

1 Side frame (vehicle body)
2 Dashboard
10 Vehicle brake system
14 Input device
16 Motor cylinder device (electric brake actuator)
18 VSA device
20a Connection port (first connection port)
20b Connection port (second connection port)
34 Master cylinder
36 First reservoir (reservoir tank)
58a First fluid pressure passage
58b Second fluid pressure passage
58c Branched fluid pressure passage
60a First cut-off valve
60b Second cut-off valve
62 Third cut-off valve
64 Stroke simulator
300 Sensor valve unit
301 Air bleeder
303 Fastener
304 Attachment plate
Pm Pressure sensor (first fluid pressure sensor)
Pp Pressure sensor (second fluid pressure sensor)

The invention claimed is:

1. An input device of a vehicle brake system, the vehicle brake system comprising: the input device into which an operation of a brake operating member is input; and an electric brake actuator which generates a brake fluid pressure based on at least an electric signal generated in accordance with the operation of the brake operating member, the input device being structured as a separate device from the electric brake actuator and including the brake operating member so as to be operated by an operator, the input device comprising:
   a master cylinder that produces a fluid pressure in accordance with the input of the operation of the brake operating member;
   a valve unit; and
   a stroke simulator that is provided side by side with the master cylinder, is in communication with the master cylinder, and applies in a pseudo manner a force counteracting the operation of the brake operating member to the brake operating member, wherein
   the input device is configured to be fixed to a vehicle dashboard,
   the master cylinder, the stroke simulator and the valve unit are formed integrally, the master cylinder, the stroke simulator, and the valve unit are provided side by side in an integral manner in a vehicle width direction, and the input device further comprises a first connection port that is in communication with the master cylinder via a first fluid pressure passage, a second connection port that is in communication with the master cylinder via a second fluid pressure passage, and a branched fluid pressure passage that is branched from the second fluid pressure passage and is in communication with the stroke simulator, a first cut-off valve is provided in the first fluid pressure passage, a second cut-off valve is provided in a portion of the second fluid pressure passage between the second connection port and a location at which the branched fluid pressure passage is branched from the second fluid pressure passage, and a third cut-off valve is provided in the branched fluid pressure passage.

2. The input device of the vehicle brake system according to claim 1, wherein the input device is in fluid communication with the electric brake actuator via the first fluid passage and the second fluid passage, and the input device further comprises:

a first pressure sensor provided on the first fluid passage between the master cylinder and the first cut-off valve, and a second pressure sensor provided on the second fluid passage between the second cut-off valve and the second connection port.

3. The input device of the vehicle brake system according to claim 2, further comprising an air bleeder for bleeding the air out of at least the master cylinder and the stroke simulator, the input device is configured to be fixed to the vehicle dashboard in an inclined orientation such that the air bleeder is disposed at a higher end of the input unit, and the air bleeder is located at the front of the input device and vents to atmosphere.

4. The input device of the vehicle brake system according to claim 1, further comprising an air bleeder for bleeding the air out of at least the master cylinder and the stroke simulator, the input device is configured to be fixed to the vehicle dashboard in an inclined orientation such that the air bleeder is disposed at a higher end of the input unit, and the air bleeder is located at the front of the input device and vents to atmosphere.

5. The input device of the vehicle brake system according to claim 1, further comprising a reservoir tank provided above the master cylinder and the stroke simulator and between the master cylinder and the stroke simulator.

6. The input device of the vehicle brake system according to claim 5, further comprising an attachment plate that enables attachment of the master cylinder and the stroke simulator to the dashboard of a vehicle, wherein a length of the attachment plate in the vehicle width direction is longer than a length of the attachment plate in a vehicle vertical direction.

7. The input device of the vehicle brake system according to claim 1, further comprising an attachment plate that enables attachment of the master cylinder and the stroke simulator to a dashboard of a vehicle, wherein a length of the attachment plate in the vehicle width direction is longer than a length of the attachment plate in a vehicle vertical direction.

8. The input device of the vehicle brake system according to claim 7, wherein the attachment plate is provided with a thinned portion.

9. The input device of the vehicle brake system according to claim 1, wherein the reservoir tank has an external shape elongated in a vehicle back-and-forth direction.

10. An input device of the vehicle brake system, the vehicle brake system comprising: the input device into which an operation of a brake operating member is input; and an electric brake actuator which generates a brake fluid pressure based on at least an electric signal generated in accordance with the operation of the brake operating member, the input device being structured as a separate device from the electric brake actuator and including the brake operating member so as to be operated by an operator, the input device comprising:

a master cylinder that produces a fluid pressure in accordance with the input of the operation of the brake operating member;

a stroke simulator that is provided side by side with the master cylinder, is in communication with the master cylinder, and applies in a pseudo manner a force counteracting the operation of the brake operating member to the brake operating member;

a recess which extends downwardly and is formed into an upper surface of the input device between the master cylinder and the stroke simulator; and a through-hole for water drainage formed through the recess, wherein the master cylinder and the stroke simulator are formed integrally, and the input device further comprises a first connection port that is in communication with the master cylinder via a first fluid pressure passage, a second connection port that is in communication with the master cylinder via a second fluid pressure passage, and a branched fluid pressure passage that is branched from the second fluid pressure passage and is in communication with the stroke simulator, a first cut-off valve is provided in the first fluid pressure passage, a second cut-off valve is provided in a portion of the second fluid pressure passage between the second connection port and a location at which the branched fluid pressure passage is branched from the second fluid pressure passage, and a third cut-off valve is provided in the branched fluid pressure passage.

11. The input device of the vehicle brake system according to claim 10, wherein a plurality of the through-holes are formed through the recess.

12. An input device of a brake-by-wire vehicle brake system, the vehicle brake system comprising: the input device into which an operation of a brake operating member is input; and an electric brake actuator which generates a brake fluid pressure based on at least an electric signal generated in accordance with the operation of the brake operating member, the input device being structured as a separate device from the electric brake actuator and including the brake operating member so as to be operated by an operator, the input device comprising:

a master cylinder that produces a fluid pressure in accordance with the input of the operation of the brake operating member; and a stroke simulator that is provided side by side with the master cylinder, is in communication with the master cylinder, and applies in a pseudo manner a force counteracting the operation of the brake operating member to the brake operating member, wherein the master cylinder and the stroke simulator are formed integrally, and a port of the master cylinder and a port of the stroke simulator formed so as to be in communication with each other via a piping which extends directly therebetween, are disposed at front end positions of the input unit, are aligned with each other in a vehicle width direction such that the port of the master cylinder and the port of the stroke simulator are at matching positions in the vehicle front-to-back direction, and have substantially a same size.

13. The input device of the vehicle brake system according to claim 12, wherein a brake fluid passage connecting together the respective ports of the master cylinder and the stroke simulator is formed so as to extend from the master cylinder and the stroke simulator toward respective lateral sides of the master cylinder and the stroke simulator.

14. The input device of the vehicle brake system according to claim 13, wherein the ports of the master cylinder and the stroke simulator are formed in respective upper portions of the master cylinder and the stroke simulator.

15. An input device of a brake-by-wire vehicle brake system, the vehicle brake system comprising: the input device into which an operation of a brake operating member is input; and an electric brake actuator which generates a brake fluid pressure based on at least an electric signal generated in accordance with the operation of the brake operating member, the input device being structured as a separate device from the electric brake actuator and including the brake operating member so as to be operated by an operator, the input device comprising:

a master cylinder that produces a fluid pressure in accordance with the input of the operation of the brake operating member; and a stroke simulator that is provided side by side with the master cylinder, is in communication with the master cylinder, and applies in a pseudo manner a force counteracting the operation of the brake operating member to the brake operating member, wherein the master cylinder and the stroke simulator are formed integrally, the input device of the vehicle brake system further comprises a valve unit including a stroke simulator cut-off valve that blocks a flow passing through the fluid pressure passage provided between the master cylinder and the stroke simulator, the master cylinder, the stroke simulator, and the valve unit are formed integrally, and the stroke simulator, the master cylinder, and the valve unit are provided side by side in this order in a vehicle width direction.

* * * * *